US012458891B2

(12) United States Patent
Li

(10) Patent No.: US 12,458,891 B2
(45) Date of Patent: Nov. 4, 2025

(54) HIT CONFIRMATION EFFECTS IN LONG-RANGE COMBAT GAMES

(71) Applicant: Tencent Technology (Shenzhen) Company Limited, Guangdong (CN)

(72) Inventor: Yizhou Li, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 244 days.

(21) Appl. No.: 18/244,184

(22) Filed: Sep. 8, 2023

(65) Prior Publication Data

US 2023/0415043 A1 Dec. 28, 2023

Related U.S. Application Data

(63) Continuation of application No. PCT/CN2023/089391, filed on Apr. 20, 2023.

(30) Foreign Application Priority Data

Jun. 27, 2022 (CN) ......................... 202210745218.4

(51) Int. Cl.

*A63F 13/577* (2014.01)
*A63F 13/52* (2014.01)
*A63F 13/54* (2014.01)
*A63F 13/837* (2014.01)

(52) U.S. Cl.

CPC ............ *A63F 13/577* (2014.09); *A63F 13/52* (2014.09); *A63F 13/54* (2014.09); *A63F 13/837* (2014.09)

(58) Field of Classification Search

CPC ........ A63F 13/577; A63F 13/52; A63F 13/54; A63F 13/837
USPC ............................................................ 463/31
See application file for complete search history.

(56) References Cited

U.S. PATENT DOCUMENTS

2012/0287163 A1* 11/2012 Djavaherian ........... G06F 3/012 345/667
2015/0273331 A1* 10/2015 McMain ................. A63F 13/45 463/31
2022/0264029 A1* 8/2022 Qi ...................... H04N 21/4402

FOREIGN PATENT DOCUMENTS

CN 114100128 A 3/2022
CN 114272604 A 4/2022

OTHER PUBLICATIONS

International Search Report and Written Opinion issued Jun. 8, 2023 in Application No. PCT/CN2023/089391, with English Translation, pp. 1-20.

* cited by examiner

*Primary Examiner* — Allen Chan
(74) *Attorney, Agent, or Firm* — ArentFox Schiff LLP

(57) ABSTRACT

A prop special effect display method includes controlling a first virtual object in a virtual scene to launch a projectile associated with a virtual prop in response to receiving a launching operation for the virtual prop. The method further includes, in response to the projectile hitting a target object in the virtual scene, determining a scaling ratio of a special effect of the virtual prop based on a distance between the first virtual object and the target object. The scaling ratio of the special effect is positively correlated with the distance, and the special effect includes at least one of a video or audio output and the scaling ratio comprises a display size or a volume. The method further includes playing the special effect of the virtual prop based on the scaling ratio of the special effect.

20 Claims, 13 Drawing Sheets

(a)

(b)

(a)

(b)

(a)

(b)

(a)

(b)

(a)

(b)

(c)

HIT CONFIRMATION EFFECTS IN LONG-RANGE COMBAT GAMES

RELATED APPLICATIONS

This application is a continuation of International Application No. PCT/CN2023/089391, filed on Apr. 20, 2023, which claims priority to Chinese Patent Application No. 202210745218.4, entitled "PROP SPECIAL EFFECT DISPLAY METHOD AND APPARATUS, ELECTRONIC DEVICE, AND STORAGE MEDIUM," filed on Jun. 27, 2022. The disclosures of the prior applications are hereby incorporated by reference in their entirety.

FIELD OF THE TECHNOLOGY

This application relates to the field of computer technologies, including a prop special effect display method and apparatus, an electronic device, and a storage medium.

BACKGROUND OF THE DISCLOSURE

With the development of computer technologies, more and more kinds of games can be performed on a terminal. By taking traditional shooting games as an example, virtual objects and virtual props are displayed in a virtual scene. After performing a triggering operation on the virtual prop, users can control the virtual object to launch a launcher associated with the virtual prop. In a case that the launcher hits a certain target (such as another virtual object, walls, obstacles, and the like), a hit special effect may be played.

SUMMARY

Embodiments of this application provide a prop special effect display method and apparatus, an electronic device, and a storage medium, which can optimize the use feeling of the virtual props and improve the human-computer interaction efficiency. The technical solutions are as follows.

In an embodiment, a prop special effect display method includes controlling a first virtual object in a virtual scene to launch a projectile associated with a virtual prop in response to receiving a launching operation for the virtual prop. The method further includes, in response to the projectile hitting a target object in the virtual scene, determining a scaling ratio of a special effect of the virtual prop based on a distance between the first virtual object and the target object. The scaling ratio of the special effect is positively correlated with the distance, and the special effect includes at least one of a video or audio output and the scaling ratio comprises a display size or a volume. The method further includes playing the special effect of the virtual prop based on the scaling ratio of the special effect.

In an embodiment, a prop special effect display apparatus includes processing circuitry configured to control a first virtual object in a virtual scene to launch a projectile associated with a virtual prop in response to receiving a launching operation for the virtual prop. The processing circuitry further configured to, in response to the projectile hitting a target object in the virtual scene, determine a scaling ratio of a special effect of the virtual prop based on a distance between the first virtual object and the target object. The scaling ratio of the special effect is positively correlated with the distance, and the special effect includes at least one of a video or audio output and the scaling ratio comprises a display size or a volume. The processing circuitry is further configured to play the special effect of the virtual prop based on the scaling ratio of the special effect.

In an embodiment, a non-transitory computer-readable storage medium storing computer-readable instructions thereon, which, when executed by processing circuitry, cause the processing circuitry to perform a prop special effect display method. The method includes controlling a first virtual object in a virtual scene to launch a projectile associated with a virtual prop in response to receiving a launching operation for the virtual prop. The method further includes, in response to the projectile hitting a target object in the virtual scene, determining a scaling ratio of a special effect of the virtual prop based on a distance between the first virtual object and the target object. The scaling ratio of the special effect is positively correlated with the distance, and the special effect includes at least one of a video or audio output and the scaling ratio comprises a display size or a volume. The method further includes playing the special effect of the virtual prop based on the scaling ratio of the special effect.

DESCRIPTION OF EMBODIMENTS

Figure 1:
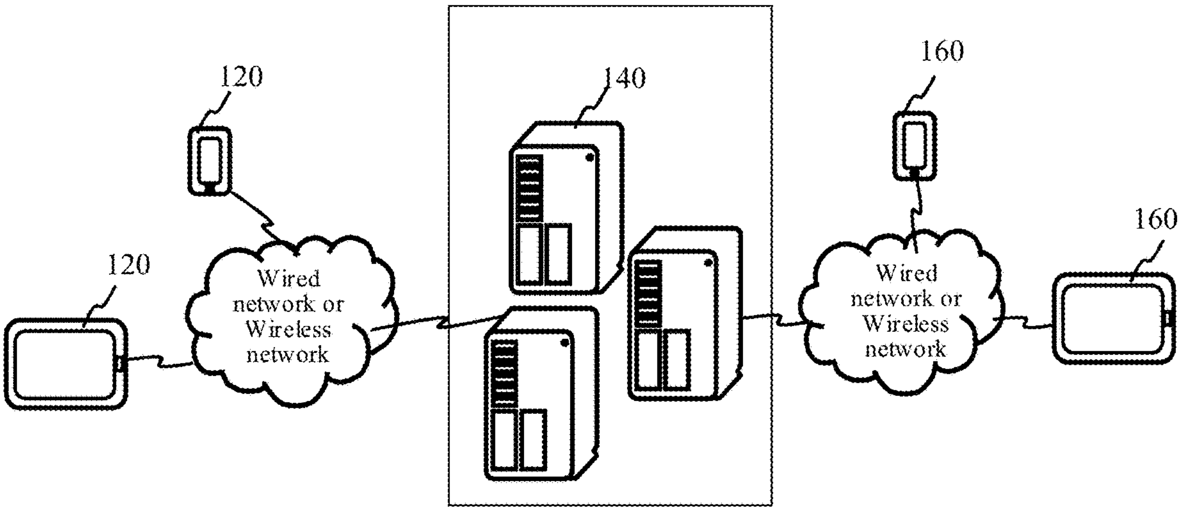
FIG. 1 is a schematic diagram of an implementation environment of a prop special effect display method according to an embodiment of this disclosure.

User information (including but not limited to equipment information, personal information, behavior information, and the like of users), data (including but not limited to to-be-analyzed data, stored data, to-be-displayed data, etc.), and signals involved in this disclosure are all approved, agreed, and authorized by the user or fully authorized by all parties in a case that the method provided in the embodiments of this disclosure is applied to a specific product or technology, and the collection, use, and processing of relevant information, data, and signals need to comply with relevant laws, regulations, and standards of relevant countries and regions. For example, control instructions or control operations for virtual objects or virtual props involved in this disclosure are acquired with full authorization.

Terms involved in this disclosure are explained as follows:

Virtual scene: the virtual scene is a virtual environment displayed (or provided) during the running of an application program on a terminal. The virtual scene may be a simulation environment for the real world, a semi-simulation and semi-fiction virtual environment, or a purely fictional virtual environment. The virtual scene may be any one of a two-dimensional virtual scene, a 2.5-dimensional virtual scene, or a three-dimensional virtual scene. The dimension of the virtual scene is not limited by the embodiments of this disclosure. For example, the virtual scene may include sky, land, ocean, and the like. The land may include desert, city, and other environmental elements, and users may control the virtual objects to move in the virtual scene. The virtual scene may also be configured to support a virtual scene battle between at least two virtual objects, and the virtual scene has virtual resources that may be used by the at least two virtual objects.

Virtual object: the virtual object refers to a movable object in the virtual scene. The movable object may be a virtual figure, a virtual animal, a cartoon figure, and the like, such as: figures, animals, plants, oil drums, walls, stone, and the like displayed in the virtual scene. The virtual object may be a virtual image for representing the user in the virtual scene. The virtual scene may include a plurality of virtual objects, and each virtual object has a shape and a size in the virtual scene, and occupies a part of space in the virtual scene. In a case that the virtual scene is a three-dimensional virtual scene, the virtual object may be a three-dimensional model, and the three-dimensional model may be a three-dimensional character constructed based on a three-dimensional human skeleton technology. The same virtual object may present different appearances by wearing different skins. In some embodiments, the virtual object may also be implemented by a 2.5-dimensional or 2-dimensional model, which is not limited by the embodiments of this disclosure.

The virtual object may be a player character controlled by operations on a client, or a non-player character (NPC) capable of interaction in the virtual scene, or a neutral virtual object (such as wild monsters capable of providing gain BUFF, empirical value, virtual treasure chests, and the like), or game robots (such as playing robots) arranged in the virtual scene. Schematically, the virtual object is a virtual figure carrying out competition in the virtual scene. The number of virtual objects participating in the interaction in the virtual scene may be preset, or determined dynamically according to the number of clients participating in the interaction.

Shooting Game (STG): STG refers to a kind of games in which a virtual object uses firearm virtual props to perform ranged attack, and the STG is one of action games and has obvious characteristics of the action games. STG includes but is not limited to first-person shooting games, third-person shooting games, top-down shooting games, head-up shooting games, platform shooting games, scroll shooting games, keyboard and mouse shooting games, shooting field games, and the like, and the type of STG is not specifically limited by the embodiments of this disclosure.

Field of view (FOV): FOV refers to a scene range seen from the perspective of the virtual object (or after an optical sight is superimposed) in a case that the virtual scene is observed, and is also referred to as field of view. Generally, the smaller the FoV, the smaller and more concentrated the field of view, and the better the magnification effect on bodies or objects within the field of view; and the greater the FoV, the larger and less concentrated the field of view, and the poorer the magnification effect on the bodies or objects in the field of view.

In some embodiments, after the virtual object is equipped with and opens the optical sight, FoV observed from an own viewing angle of the virtual object is negatively correlated with a magnification ratio of the optical sight. That is, the greater the magnification ratio of the optical sight, the better the magnification effect on the bodies or objects in the field of view; therefore, the smaller and more concentrated the field of view, the smaller the value of FoV (that is, the field of view is narrow, and the viewing angle is small); and otherwise, the smaller the magnification ratio of the optical sight, the poorer the magnification effect on the bodies or objects in the field of view; therefore, the larger and less concentrated the field of view, the greater the value of FoV (that is, the field of view is wide, and the viewing angle is large).

Schematically, since the type of the optical sight determines the magnification ratio of the optical sight, the type of the optical sight and the FoV of the virtual object have a mapping relationship as shown in table 1:

TABLE 1

| Type of optical sight | FoV of the virtual object |
|---|---|
| None | 75 |
| Two-times scope | 35 |
| Four-times scope | 17.5 |
| Six-times scope | 11.67 |
| Eight-times scope | 8.75 |
| Sixteen-times scope | 4.375 |

It may be seen from table 1 that in a case that the virtual object is not equipped with the optical sight, the value of FoV is 75. In a case that the virtual object opens the two-times scope (for example, the magnification ratio of the two-times scope is 2), the value of FoV is 35, so it can be seen that the field of view is narrowed, but the body or object in the field of view is magnified by the two-times scope. In a case that the virtual object opens the four-times scope (for example, the magnification ratio of the four-times scope is 4), the value of FoV is 17.5, so it can be seen that the field of view is further narrowed, but the body or object in the field of view is further magnified by the four-times scope.

It should be noted that, the foregoing description only takes the magnification ratio of the two-times scope as 2 and the magnification ratio of the four-times scope as 4 as an example. In some embodiments, specific lens parameters of the two-times scope and the four-times scope may be set by the technical skills. It is possible that the magnification ratio of the two-times scope is not strictly equal to 2, and the magnification ratio of the four-times scope is not strictly equal to 4, but it is ensured that the magnification ratio of the four-times scope is twice that of the two-times scope. Or, it is ensured that the magnification ratio of the four-times scope is greater than that of the two-times scope, but the magnification ratio of the four-times scope is not exactly twice that of the two-times scope. The relationship between the magnification ratio and the type of the optical sight is not specifically limited by the embodiments of this disclosure.

It should be noted that, Table 1 only shows a possible mapping relationship between one type of the optical sight and FoV of the virtual object, but there may be other numerical mapping relationships between the type of the optical sight and FoV, as long as it is ensured that the magnification ratio determined by the type of the optical sight is negatively correlated with the FoV, which is not specifically limited by the embodiments of this disclosure.

The shooting games of a large-range scene or an open world is taken as an example for description. The virtual scene of this kind of shooting games is generally broad, and there are at least two virtual objects carrying out a single-round confrontation mode in the virtual scene. It is assumed that the virtual object controlled by the current terminal is referred to as a first virtual object, and the first virtual object can survive in the virtual scene by avoiding the damage initiated by a second virtual object controlled by another player and dangers (such as swamps) existing in the virtual scene. In a case that a virtual hit point of any virtual object in the virtual scene is less than a survival threshold, the virtual object is phased out. The foregoing confrontation takes a moment when a first terminal joins the confrontation as a starting moment, and takes a moment when the last terminal quits the confrontation as an ending moment. Competitive modes of the confrontation may include a single-player confrontation mode, a double-player group confrontation mode, or a multi-player group confrontation mode, etc. The competitive mode is not specifically limited by the embodiments of this disclosure.

System architectures involved in this disclosure are introduced below.

FIG. 1 is a schematic diagram of an implementation environment of a prop special effect display method according to an embodiment of this disclosure. Referring to FIG. 1, the implementation environment includes: a first terminal 120, a server 140, and a second terminal 160.

The terminal 120 is equipped and run with an application program supporting a virtual scene. The application program includes: any one of a first-person shooting game (FPS), a third-person shooting game (TPS), a multiplayer online battle arena (MOBA) game, a virtual-reality application program, a three-dimensional map program, or a multi-person instrument survival game. In some embodiments, the first terminal 120 is a terminal used by a first user. In a case that the first terminal 120 runs the application program, a screen of the first terminal 120 displays a user interface of the application program, and the virtual scene is loaded and displayed in the application program based on a starting operation of the first user in the user interface. The user uses the first terminal 120 to operate the first virtual object located in the virtual scene to carry out activities. The activities include, but are not limited to: any one of adjustment of body posture, creeping, walking, running, riding, jumping, driving, picking, shooting, attacking, throwing, and confrontation. Schematically, the first virtual object may be a virtual figure, such as a simulation figure character or a cartoon figure character.

The first terminal 120 and the second terminal 160 are connected with the server 140 directly or indirectly by using a wireless network or a cabled network.

The server 140 includes at least one of a server, multiple servers, cloud computing platforms or a virtual center. The server 140 is configured to provide a background service for the application program supporting the virtual scene. The server 140 undertakes main computing work, and the first terminal 120 and the second terminal 160 undertake secondary computing work; or, the server 140 undertakes the secondary computing work, and the first terminal 120 and the second terminal 160 undertake the main computing work; or, the server 140, the first terminal 120, and the second terminal 160 adopt a distributed computing architecture for collaborative computing.

The server 140 is an independent physical server, or a server cluster or a distributive system composed of a plurality of physical servers, or a cloud server providing cloud services, cloud databases, cloud computation, cloud functions, cloud storage, network services, cloud communication, middle-ware services, domain name services, security services, content delivery network (CDN), and basic cloud computing services such as big data, artificial intelligent platforms, and the like.

The second terminal 160 is equipped and run with an application program supporting the virtual scene. The application program includes: any one of a FPS game, a TPS game, a MOBA game, a virtual-reality application program, a three-dimensional map program, or a multi-person instrument survival game. In some embodiments, the second terminal 160 is a terminal used by a second user. In a case that the second terminal 160 runs the application program, a screen of the second terminal 160 displays a user interface of the application program, and the virtual scene is loaded and displayed in the application program based on the starting operation of the second user in the user interface. The second user uses the second terminal 160 to operate the second virtual object located in the virtual scene to carry out activities. The activities include, but are not limited to: any one of adjustment of body posture, creeping, walking, running, riding, jumping, driving, picking, shooting, attacking, throwing, and confrontation. Schematically, the second virtual object may be another virtual figure that is different from the first virtual object, such as a simulation figure character or a cartoon figure character.

In some embodiments, the first virtual object controlled by the first terminal 120 and the second virtual object controlled by the second terminal 160 are located in the same virtual scene, and the first virtual object can interact with the second virtual object in the virtual scene.

The first virtual object and the second virtual object are in a hostile relationship; for example, the first virtual object and the second virtual object belong to different camps or teams; and the virtual objects in the hostile relationship can perform the confrontation interaction on land, for example, launch launchers of shooting props to each other, or throw throwing props.

The first virtual object and the second virtual object are allies, for example, the first virtual object and the second virtual object belong to the same camp or the same team, or are friends, or have temporary communication permission.

The application programs installed on first terminal 120 and the second terminal 160 are the same, or the application programs installed on the two terminals are the same type of application programs of different operating system platforms. The first terminal 120 and the second terminal 160 both refer to one of a plurality of terminals. The embodiments of this disclosure only take the first terminal 120 and the second terminal 160 as an example for description.

The equipment types of the first terminal 120 and the second terminal 160 are same or different, and the equipment type includes: at least one of a smart phone, a tablet computer, a smart speaker, a smart watch, a smart handheld, a portable game device, a vehicle terminal, a laptop computer, and a desktop computer, but the equipment type is not limited thereto. For example, the first terminal 120 and the second terminal 160 both are the smart phone, or other handheld portable game devices. The following embodiment is described by taking the terminal including the smart phone as an example.

Those skilled in the art can know that the number of the terminals is more or less. For example, the number of the terminal is only one, or the number of terminals is tens, hundreds, or more. The embodiments of this disclosure do not limit the number and equipment type of the terminal.

Figure 2:
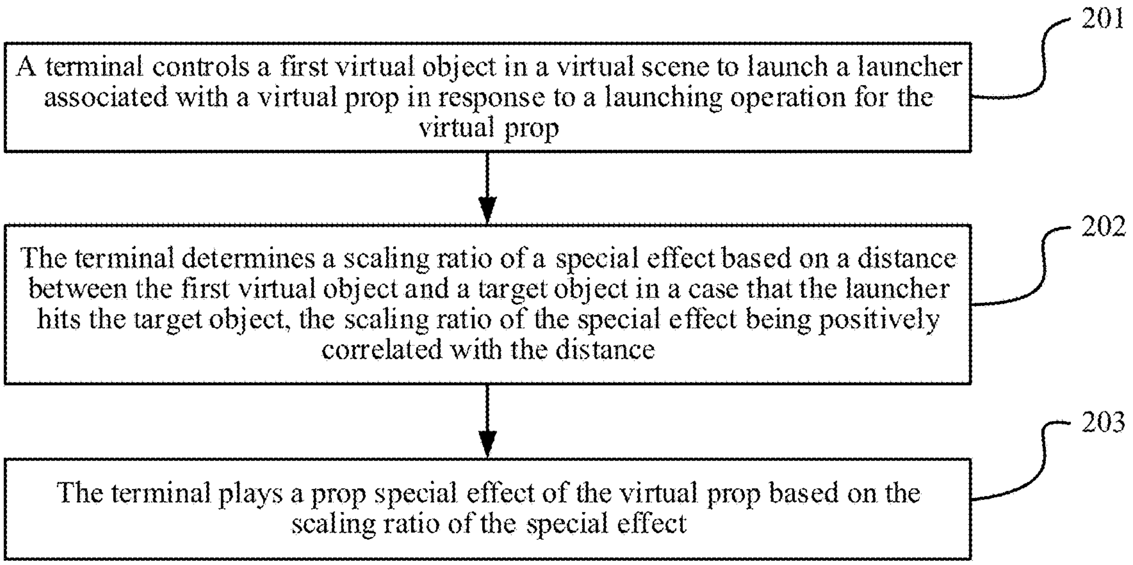
FIG. 2 is a flowchart of a prop special effect display method according to an embodiment of this disclosure.

FIG. 2 is a flowchart of a prop special effect display method according to an embodiment of this disclosure. Referring to FIG. 2, the embodiment is executed by an electronic device, and described by taking the electronic device being a terminal as an example. The embodiment includes the following steps:

201: The terminal controls a first virtual object in a virtual scene to launch a launcher associated with a virtual prop in response to a launching operation for the virtual prop. For example, a first virtual object is controlled in a virtual scene to launch a projectile associated with a virtual prop in response to receiving a launching operation for the virtual prop.

The terminal involved in the embodiment of this disclosure refers to any electronic device with a prop special effect playing function used by the user. The terminal is equipped and run with an application program supporting the virtual scene. The application program includes: any one of a FPS game, a TPS game, a MOBA game, a virtual-reality application program, a three-dimensional map program, or a multi-person instrument survival game.

A first virtual object involved in the embodiment of this disclosure refers to a virtual object controlled by the user using the terminal, and is also referred to as a controlled virtual object. The first virtual object is controlled by the user corresponding to the terminal, and can carry out various kinds of activities in the virtual scene. The activities include, but are not limited to: any one of adjustment of body posture, creeping, walking, running, riding, jumping, driving, picking, shooting, attacking, throwing, and confrontation.

The virtual prop involved in the embodiment of this disclosure refers to a shooting prop that is already assembled on the first virtual object, and in a case of being triggered, the shooting prop may launch a launcher associated with the shooting prop. Different virtual props may be associated with the same or different launchers. The association between the virtual prop and the launcher means that a model of the launcher matches a model of the virtual prop. For example, the virtual prop refers to a virtual instrument with a shooting function, and the launcher refers to a virtual bow and arrow, virtual ammunition, and the like matching the model of the virtual instrument. The association between each virtual prop and the launcher is preset by a server. Each virtual prop may be associated with one or more launchers. Similarly, each launcher may also be associated with one or more virtual props, which is not specifically limited by the embodiments of this disclosure.

In some embodiments, after the user initiates the application program, such as a game application on the terminal, the terminal loads and displays the virtual scene in the game application. The terminal displays at least the first virtual object controlled by the terminal and the virtual prop assembled on the first virtual object in the virtual scene.

In some embodiments, the virtual prop is configured by the user before starting a game, and carried by the first virtual object into the game; or, the virtual prop is a prop that is picked by the first virtual object controlled by the user in the virtual scene; or, the virtual prop is a prop that is bought or exchanged by the user for the first virtual object in a shopping mall; or, the virtual prop is a reward prop obtained in a case that the first virtual object defeats a specified number of other virtual objects; or, the virtual prop is a reward prop obtained in a case that the first virtual object defeats more than two other virtual objects continuously in a specified period of time; or, the virtual prop is a prop with using right unlocked as a grade of the first virtual object is increased or the first virtual object accumulates the energy in other recharging way. The source of the virtual prop is not specifically limited by the embodiments of this disclosure.

In some embodiments, after obtaining the virtual prop, the first virtual object may open a backpack interface to assemble the virtual prop, or, after obtaining the virtual prop, the first virtual object automatically assembles the virtual prop, which is not limited specifically by the embodiments of this disclosure.

In some embodiments, in a case that the virtual prop is a shooting prop, the user executes a launching operation for the virtual prop, so that the terminal controls the first virtual object to launch a launcher associated with the virtual prop in response to the launching operation for the virtual prop. A shooting control (commonly known as a fire key) is also displayed in the virtual scene, and the user may trigger the launching operation based on the shooting control. For example, a shooting mode of the virtual prop is classified into an aim-down-sight (ADS) aim mode and a hip fire mode (i.e. a non-ADS aim mode). In the ADS aim mode, the terminal may control the first virtual object to open an optical sight, and aims at a shooting target for shooting based on the view of the optical sight. In the hip fire mode, the first virtual object may not open the optical sight, and the terminal controls the first virtual object to directly aim at the shooting target from own view for shooting. In different shooting modes, different types of launching operations may be provided, which is described separately below.

Schematically, in the ADS aim mode, the user first clicks the shooting control to trigger and open the optical sight, and switches the view from the first virtual object to the view magnified by the optical sight. Then the user may adjust the shooting target by using a joystick control (for example, the shooting target that is aimed at present is prompted by a sight bead, or the prompt of the sight bead may also be canceled to increase the aiming difficulty). After the user adjusts the shooting target, the user clicks the shooting control again, which may trigger the firing to the shooting target, that is, the first virtual object is controlled to launch the launcher associated with the virtual prop to the shooting target. The shooting target here refers to a position coordinate aimed actually by the aiming operation; however, due to the possibility of incorrect aiming, causing the target missing, there may not be an entity that can be hit at this position coordinate.

The user clicks the shooting control for the first time, and after triggering and opening the optical sight, the user adjusts the shooting target of this time by using the joystick control, and automatically triggers the firing to the shooting target after releasing the joystick control.

The user presses a shooting control for a long time to trigger the opening of the optical sight, and then the shooting control may be switched to the joystick control; and by maintaining the pressing, the user may adjust the shooting target of this time by using the joystick control; and in a case that the user releases the joystick control, the firing to the shooting target may be automatically triggered, and the joystick control may be switched back again to the shooting control after the firing.

The user clicks the shooting control to trigger the opening of the optical sight, and adjusts the view magnified by the optical sight by shaking the terminal up and down, left and right, and back and forth. Then, the user clicks on any position in the view, the clicked position is used as the shooting target this time, and after releasing the hand, the firing to the shooting target is automatically triggered.

Schematically, in the hip fire mode, the user clicks the shooting control and enters an aiming state in the view of the first virtual object. The user may adjust the shooting target of this time by using the joystick control. After the adjustment, the user clicks the shooting control again to trigger the firing to the shooting target.

The user clicks the shooting control for the first time, after triggering the aiming state, the user adjusts the shooting target of this time by using the joystick control, and after the user releases the joystick control, the firing to the shooting target may be automatically triggered.

The user presses the shooting control for a long time to trigger the aiming state, and then the shooting control may be switched to the joystick control; by maintaining the pressing, the user may adjust the shooting target of this time by using the joystick control; and in a case that the user releases the joystick control, the firing to the shooting target may be automatically triggered, and the joystick control may be switched back again to the shooting control after the firing.

The user clicks the shooting control to trigger the aiming state, and may adjust partial virtual scene seen from the view of the first virtual object by shaking the terminal up and down, left and right, and back and forth. Then, the user clicks on any position in the view, and the clicked position is used as the shooting target of this time. After releasing the hand, the firing to the shooting target is automatically triggered.

The foregoing description provides the trigger way of the launching operations respectively in the ADS aim mode and the hip fire mode. In the embodiments of this disclosure, the shooting mode of the virtual prop used by the first virtual object is not specifically limited, and the trigger way for the launching operation in the shooting mode is not specifically limited.

In some embodiments, after detecting the launching operation for the virtual prop, the terminal determines the position coordinate of the shooting target aimed by the launching operation, also determines the position coordinate of the virtual prop, and determines a launching trajectory with the position coordinate of the virtual prop as a starting point and the position coordinate of the shooting target as an ending point. The launching trajectory may be a straight line, a parabola, an irregular curve, and the like. The type of the launching trajectory is not specifically limited by the embodiments of this disclosure. Then the terminal controls the launcher associated with the virtual prop to move along the launching trajectory. However, there may be some situations such as inaccurate aiming, target missing, object originally aimed escaping successfully by walking, etc., so that during the movement of the launcher along the launching trajectory, it is possible that there is no entity on the ending point in a case that the launcher moves to the ending point of the launching trajectory, and the launcher may not hit any object at this time. Or, it is also possible that the launcher just hits the object (that may be the virtual object controlled by another user or a virtual body) on the ending point in a case of moving to the ending point of the launching trajectory. Or, the launcher may also encounter an obstacle on the launching trajectory, and then the launcher may hit the obstacle (such as a shelter, the virtual object controlled by another user, the virtual body, etc.). Whether the launcher may hit the object, or whether the launcher hits the object at the ending point of the launching trajectory is not specifically limited by the embodiments of this disclosure. In a case that the launcher hits any object, step 202 is performed.

202: The terminal determines a scaling ratio of a special effect based on a distance between the first virtual object and a target object in a case that the launcher hits the target object, and the scaling ratio of the special effect is positively correlated with the distance. For example, in response to the projectile hitting a target object in the virtual scene, a scaling ratio of a special effect of the virtual prop is determined based on a distance between the first virtual object and the target object. The scaling ratio of the special effect is positively correlated with the distance, and the special effect includes at least one of a video or audio output and the scaling ratio comprises a display size or a volume.

The target object involved in the embodiments of this disclosure refers to an entity object hit by the launcher and located in the virtual scene. For example, the target object is a virtual object (such as a second virtual object) controlled by another user. For another example, the target object is a virtual body. The type of the target object is not specifically limited by the embodiments of this disclosure. Furthermore, the target object may be the obstacle hit by the launcher during the movement along the launching trajectory, or an entity object hit by the launcher in a case of moving to the ending point of the launching trajectory. Whether the target object is located at the ending point of the launching trajectory is not specifically limited by the embodiments of this disclosure.

The scaling ratio of the special effect involved in the embodiment of this disclosure refers to a ratio for controlling a display size of the prop special effect in the virtual scene in a case that the prop special effect of the virtual prop is played. For example, in a case that the scaling ratio of the special effect is 1, the prop special effect is displayed in a standard size; in a case that the scaling ratio of the special effect is 0.5, the prop special effect is displayed in a size that is reduced by half from the standard size; and in a case that the scaling ratio of the special effect is 2, the prop special effect is displayed in a size that is doubled from the standard size.

In some embodiments, in a case that the launcher hits the target object, the terminal determines the distance between the first virtual object and the target object in the virtual scene. The terminal obtains the scaling ratio of the special effect that is positively correlated with the distance. It should be noted that, the scaling ratio of the special effect is positively correlated with the distance between the first virtual object and the target object, which refers to that the scaling ratio of the special effect may increase with the increase of the distance, and the scaling ratio of the special effect may decrease with the decrease of the distance. That is, the longer the distance between the first virtual object and the target object, the greater the scaling ratio of the special effect, which can appropriately magnify the prop special effect displayed in a case of long-range shooting, prevent the prop special effect from being ignored in a case of long-range shooting, and improve the information acquisition efficiency and the human-computer interaction efficiency. Otherwise, the shorter the distance between the first virtual object and the target object, the smaller the scaling ratio of the special effect, which can prevent the prop special effect from blocking the content in the virtual scene too much in a case of close-range shooting, so that the information acquisition efficiency and the human-computer interaction efficiency can also be improved.

In some embodiments, the relationship between the scaling ratio of the special effect and the distance may be a linear positive correlation, a positive correlation controlled by a step or ladder function, or a positive correlation controlled by an exponential function, a logarithmic function, or other specified functions, which is not specifically limited by the embodiments of this disclosure.

In an exemplary scene, in the shooting games of the large-range scene or the open world, the game difficulty is increased to improve the fun of players. On one hand, the aiming difficulty may be increased by canceling a sight bead in an optical sight, that is, the user needs to aim at the shooting target by using a center of the optical sight (that is not high-light displayed in a sight bead way). On the other hand, hit text prompt information displayed in a head-up display (HUD) way in the virtual scene may also be removed in a case that the launcher hits the target object, that is, the user needs to judge whether the launcher launched this time hits the target object by using the prop special effect. How to play the prop special effect of the virtual prop under the action of the two measures is particularly important. In this scene, the scaling ratio of the special effect is controlled according to the distance between the first virtual object and the target object, which can prevent the prop special effect from being ignored in a case of long-range shooting, so that even in a case of long-range shooting, the user can learn whether the launcher launched this time hits the target object or not by playing the prop special effect, the information acquisition efficiency of the user is greatly improved, whether a second launcher needs to be launched and subsequent confrontation strategies can be determined by the user, and the human-computer interaction efficiency is also greatly improved.

203: The terminal plays the prop special effect of the virtual prop based on the scaling ratio of the special effect. For example, the special effect of the virtual prop is played based on the scaling ratio of the special effect.

In some embodiments, the prop special effect is a hit special effect bound to the virtual prop. The prop special effect is used for prompting that the launcher of the virtual prop hits the target object, and different virtual props may have different prop special effects. The above hit special effect may also be called impact special effect, which refers to an attacked special effect played after the launcher hits the target object.

In some embodiments, because of the near-big and far-small vision principle, in a case that the target object is observed within the field of view of the first virtual object, a basic scaling coefficient for the target object may be determined based on the distance between the first virtual object and the target object. The basic scaling coefficient is negatively correlated with the distance. That is, the basic scaling coefficient may be reduced with the increase of the distance, and the basic scaling coefficient may be increased with the decrease of the distance, which can ensure that the near-big and far-small vision principle is obeyed in a case that the target object is observed within the field of view of the first virtual object.

In some embodiments, the terminal determines the prop special effect associated with the virtual prop and the standard size of the prop special effect. Then, the terminal adjusts the standard size of the prop special effect based on the basic scaling coefficient of the target object and the scaling ratio of the special effect determined in step 202 to obtain the display size of this time. Then, the terminal plays the prop special effect in the display size.

Since the virtual prop hits the target object, the prop special effect is played in the display size based on the target object, and the prop special effect may disappear automatically from the virtual scene after being played. For example, the prop special effect is played on the target object. In a case that the prop special effect is played, the prop special effect may be played in a floating layer, and the floating layer is displayed at an upper layer of the target object.

In the foregoing process, in a case of long-range shooting, the display size of the prop special effect finally played by the terminal is reduced by the basic scaling coefficient according to the near-big and far-small vision principle, and then magnified appropriately under the control of the scaling ratio of the special effect. In other words, the basic scaling coefficient acts both on the target object and the prop special effect displayed based on the target object. The scaling ratio of the special effect acts only on the prop special effect displayed based on the target object, so that the prop special effect is inconsistent with a scaling effect of the target object. Originally, the prop special effect and the target object are both affected by the basic scaling coefficient, and scaled according to a same ratio. However, in the embodiment of this disclosure, the target object is scaled still according to the basic scaling coefficient, but the prop special effect may be affected by both the basic scaling coefficient and the scaling ratio of the special effect. Based on the reduction by the original basic scaling coefficient, the prop special effect is appropriately magnified by the scaling ratio of the special effect.

In an example, it is assumed that the standard size of the prop special effect is equal to a palm size of the target object, in a case of long-range shooting, affected by the near-big and far-small vision principle, it is assumed that the basic scaling coefficient is 0.5, the basic scaling coefficient acts both on the target object and the prop special effect displayed based on the target object, so that the size of the target object and the prop special effect is reduced by ½, and the prop special effect with the size of 0.5 times of the palm size may be played at this time. However, in the embodiments of this disclosure, a scaling ratio of the special effect that is positively correlated with the distance may be determined for the prop special effect based on the step 202. For example, the scaling ratio of the special effect is 1.5, it can be determined that the final scaling ratio of the prop special effect may be a product (0.75) of the scaling ratio (1.5) of the special effect and the basic scaling coefficient (0.5). Therefore, the prop special effect with the size of 0.75 times of the palm size may be played finally. Compared with the method in which the prop special effect is scaled and displayed only according to the basic scaling coefficient, the display size of the prop special effect played in a case of long-range shooting can be magnified appropriately, so that the prop special effect can be prevented from being ignored in a case of long-range shooting, and even in a case of long-range shooting, the user can also learn whether the launcher launched this time hits the target object or not by playing the prop special effect, thereby greatly improving the information acquisition efficiency of the user, also facilitating the user to determine whether the second launcher needs to be launched and determine the subsequent confrontation strategy, and greatly improving the human-computer interaction efficiency.

Any combination of the foregoing technical solutions may be used to obtain an embodiment of this disclosure. Details are not described herein.

According to the method provided in the embodiments of this disclosure, in a case that the launcher of the virtual prop hits the target object, the scaling ratio of the special effect positively correlated with the distance is determined based on the distance between the first virtual object and the target object hit this time, and the prop special effect is played according to the determined scaling ratio of the special effect. In this way, even in a case of long-range shooting, the prop special effect that is reduced originally under the near-big and far-small vision principle is magnified by increasing the scaling ratio of the special effect, so that the prop special effect played in the virtual scene is more prominent, thereby increasing amount of information carried in the virtual scene, and improving the information acquisition efficiency. Since the phenomenon that the prop special effect is easy to ignore in a case of long-range shooting is improved, the use feeling of the virtual prop is also optimized, thereby improving the human-computer interaction efficiency.

In the previous embodiment, the process of the prop special effect display method involved in the embodiment of this disclosure is simply introduced, and may be introduced in detail for the shooting game scene of the large-range scene or the open world in this embodiment of this disclosure.

In the shooting game of the large-range scene or the open world, in order to increase the game difficulty to improve the fun of the player, on one hand, the aiming difficulty may be increased by canceling a sight bead in an optical sight, that is, the user needs to aim at the shooting target by using the center of the optical sight (that is not high-light displayed in a sight bead way). On the other hand, hit text prompt information displayed in a HUD way in the virtual scene in a case that the launcher hits the target object may also be removed, that is, the user needs to judge whether the launcher launched this time hits the target object by using the prop special effect. How to play the prop special effect of the virtual prop under the action of the two measures is particularly important.

Figure 3:
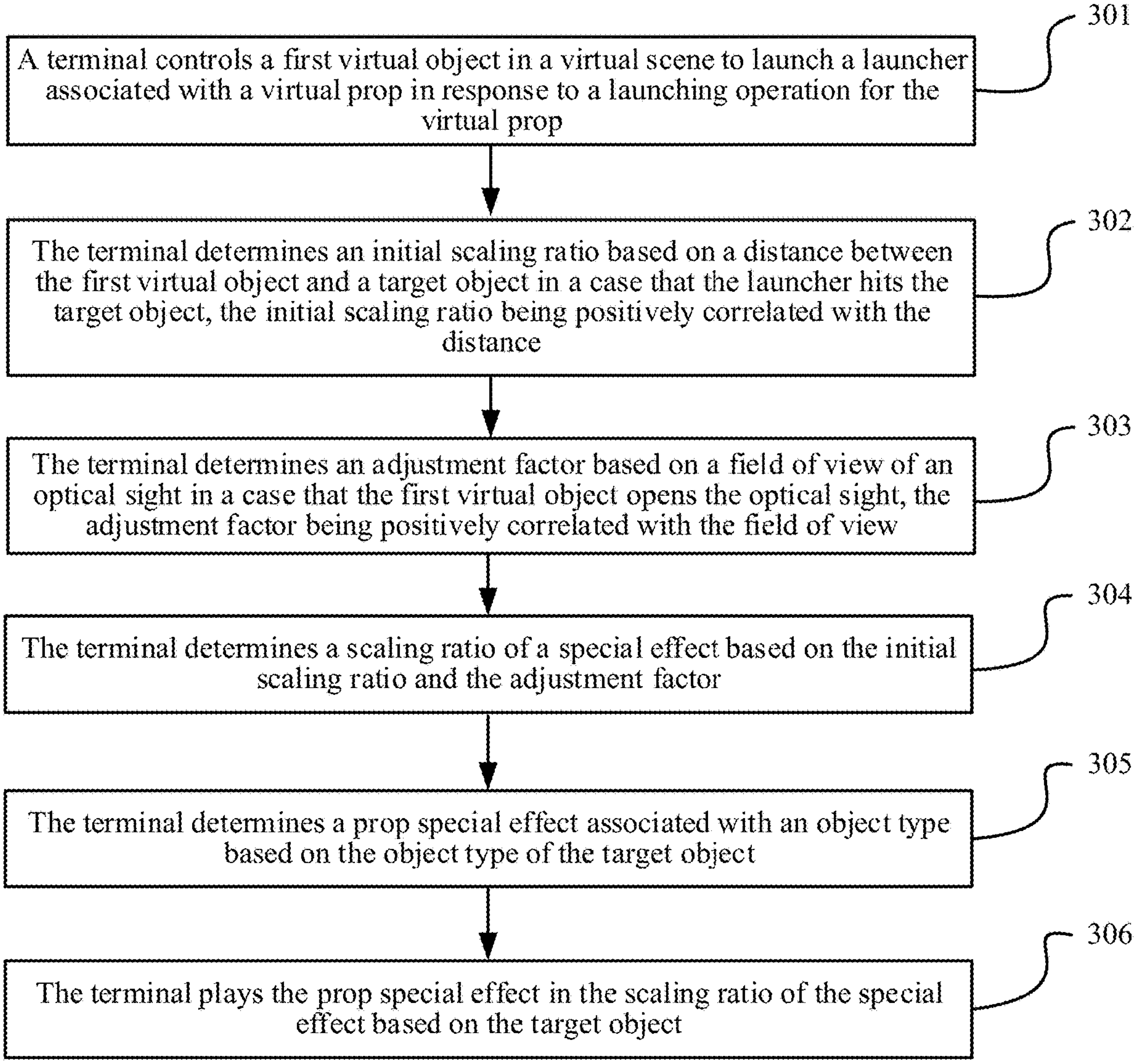
FIG. 3 is a flowchart of a prop special effect display method according to an embodiment of this disclosure.

FIG. 3 is a flowchart of a prop special effect display method according to an embodiment of this disclosure. Referring to FIG. 3, the embodiment is executed by an electronic device, and described by taking the electronic device being a terminal as an example. The embodiment includes the following steps:

301: The terminal controls a first virtual object in a virtual scene to launch a launcher associated with a virtual prop in response to a launching operation for the virtual prop.

The foregoing step 301 is similar to the foregoing step 201, and details are not described herein again.

302: The terminal determines an initial scaling ratio based on a distance between the first virtual object and a target object in a case that the launcher hits the target object, and the initial scaling ratio is positively correlated with the distance.

Since the target object may be a virtual object controlled by another player, or a virtual body that is not controlled by the player, the foregoing two situations of the target object are classified for discussion in this embodiment of this disclosure.

Situation I: the target object is a virtual object controlled by another player.

The virtual object controlled by another player being a second virtual object is taken as an example for description. That is, the target object hit by the launcher transmitted by the first virtual object by using the virtual prop is the second virtual object. The second virtual object may belong to the same or different camp/team as the first virtual object, which is not specifically limited by the embodiment of this disclosure.

In some embodiments, in a case that the launcher hits the second virtual object, the terminal may not distinguish different body parts of the second virtual object, that is, no matter which body part of the second virtual object is hit, the initial scaling ratio is determined according to the distance between the first virtual object and the second virtual object, and the determination way is similar to the determination way of the following situation II, which is not repeated herein.

In some embodiments, in a case that the launcher hits the second virtual object, the terminal determines the initial scaling ratio based on the body part of the second virtual object hit by the launcher and the distance between the first virtual object and the second virtual object. In other words, the terminal determines different scaling ratios for the body part of the second virtual object hit by the launcher. Both the distance and the body part are considered during the determination of the scaling ratio, which can ensure that the prop special effect is still prominent in a case of long-range shooting, and is convenient for the user to rapidly judge which body part is hit by the launcher this time according to the display size of the played prop special effect.

In some embodiments, in a case that the terminal determines the initial scaling ratio based on the body part and the distance, the following steps A1 and A2 are performed:

A1: The terminal determines a distance scaling curve associated with the body part based on the body part of the second virtual object hit by the launcher.

The distance scaling curve represents a relationship between the scaling ratio of the special effect and a first distance in a case that the body part is hit. The first distance refers to a distance between the first virtual object and the second virtual object.

In some embodiments, the server side configures different distance scaling curves for different body parts, and transmits the correlation between the body parts and the distance scaling curves to the terminal. The terminal may pull and cache all distance scaling curves and the foregoing correlations from the server. Then, after determining the body part of the second virtual object hit by the launcher this time, the terminal takes a part identifier of the body part as an index to inquire a curve identifier correlated with the part identifier from the correlations. The terminal reads the distance scaling curve indicated by the curve identifier from the cache, and the read distance scaling curve is the distance scaling curve correlated with the body part.

In an exemplary scene, the body part including head, chest, arms, and legs is taken as an example for description, and four different distance scaling curves are configured for the above four body parts: Curve1, Curve2, Curve3, and Curve4, and the correlations between the body parts and the distance scaling curves are shown in table 2:

TABLE 2

| Hit body part | Distance scaling curve |
|---|---|
| Head | Curve1 |
| Chest | Curve2 |
| Arms | Curve3 |
| Legs | Curve4 |

It may be seen from table 2 that in a case that the head is hit, Curve1 is selected as the corresponding distance scaling curve. In a case that the chest is hit, Curve2 is selected as the corresponding distance scaling curve. In a case that the arm is hit, Curve3 is selected as the corresponding distance scaling curve. In a case that the legs are hit, Curve4 is selected as the corresponding distance scaling curve.

Figure 4:
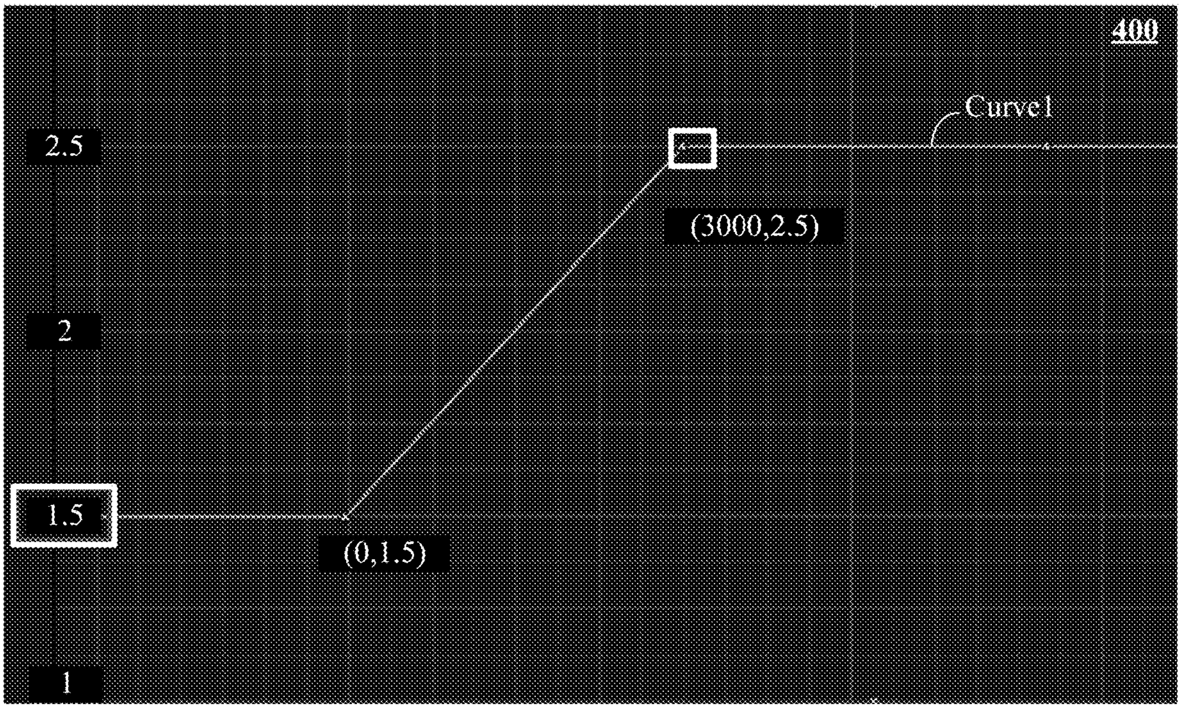
FIG. 4 is a schematic diagram of a distance scaling curve Curve1 according to an embodiment of this disclosure.

FIG. 4 is a schematic diagram of a distance scaling curve Curve1 according to an embodiment of this disclosure. As shown in 400, the distance scaling curve Curve1 provided in a case that the head is hit is shown. A horizontal axis of Curve1 represents the distance between the first virtual object and the second virtual object, and a longitudinal axis of Curve1 represents the scaling ratio of the prop special effect in a case that the head is hit. It may be seen that the scaling ratio is positively correlated with the distance between the first virtual object and the second virtual object. For example, a coordinate point (0, 1.5) in Curve1 represents that the scaling ratio is 1.5 in a case that the distance between the first virtual object and the second virtual object is 0, that is, the prop special effect is magnified to 1.5 times from the standard size. For another example, a coordinate point (3000, 2.5) in Curve1 represents that the scaling ratio is 2.5 in a case that the distance between the first virtual object and the second virtual object is 3000 cm (i.e. 30 m), that is, the prop special effect is magnified to 2.5 times from the standard size.

Figure 5:
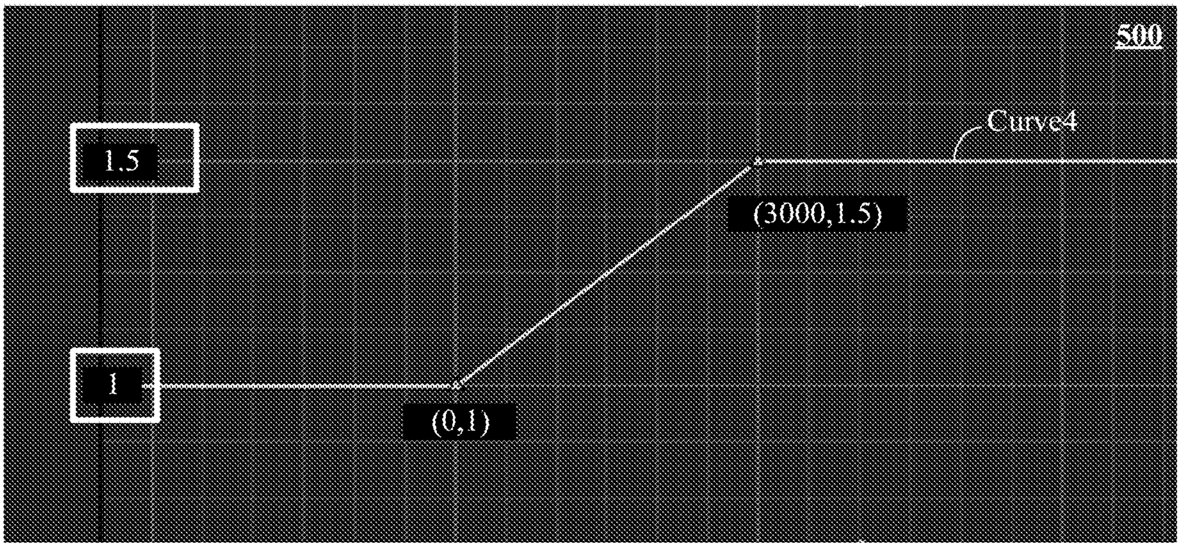
FIG. 5 is a schematic diagram of a distance scaling curve Curve4 according to an embodiment of this disclosure.

FIG. 5 is a schematic diagram of a distance scaling curve Curve4 according to an embodiment of this disclosure. As shown in 500, the distance scaling curve Curve4 provided in a case that the legs are hit is shown. A horizontal axis of Curve4 represents the distance between the first virtual object and the second virtual object, and a longitudinal axis of Curve4 represents the scaling ratio of the prop special effect in a case that the legs are hit. It may be seen that the scaling ratio is still positively correlated with the distance between the first virtual object and the second virtual object. For example, a coordinate point (0, 1) in Curve4 represents that the scaling ratio is 1 (that is equal to the standard size) in a case that the distance between the first virtual object and the second virtual object is 0. For another example, a coordinate point (3000, 1.5) in Curve1 represents that the scaling ratio is 1.5 in a case that the distance between the first virtual object and the second virtual object is 3000 cm (i.e. 30 m).

By comparing FIG. 4 and FIG. 5, it may be seen that the scaling ratio is positively correlated with the distance between the first virtual object and the second virtual object regardless of whether the head or both legs are hit. However, in a case that the distance between the first virtual object and the second virtual object is the same, the scaling ratio in a case that the head is hit is obviously greater than the scaling ratio in a case that the legs are hit, which means that in a case that the long-range shooting is carried out from the same position, the prop special effect displayed in a case that the head is hit may be more obvious than the prop special effect displayed in a case that the legs are hit. Therefore, which body part is hit this time may be prompted to the user by using the scaling ratio of the prop special effect, thereby significantly improving the information acquisition efficiency of the user.

A2: The terminal determines the initial scaling ratio matched with the distance based on the distance scaling curve.

In some embodiments, the terminal can obtain a distance scaling function corresponding to the distance scaling curve based on the distance scaling curve. The terminal may output the initial scaling ratio matched with the distance by substituting the distance between the first virtual object and the second virtual object into the distance scaling function. For example, the distance scaling function is a function mapping relationship taking the distance as an independent variable and the scaling ratio as a dependent variable. Then, after the distance between the first virtual object and the second virtual object is determined, the distance is substituted into the independent variable in the distance scaling function, and the dependent variable, i.e. the scaling ratio may be calculated and outputted; and then the scaling ratio outputted by the distance scaling function is used as the initial scaling ratio.

Figure 6:
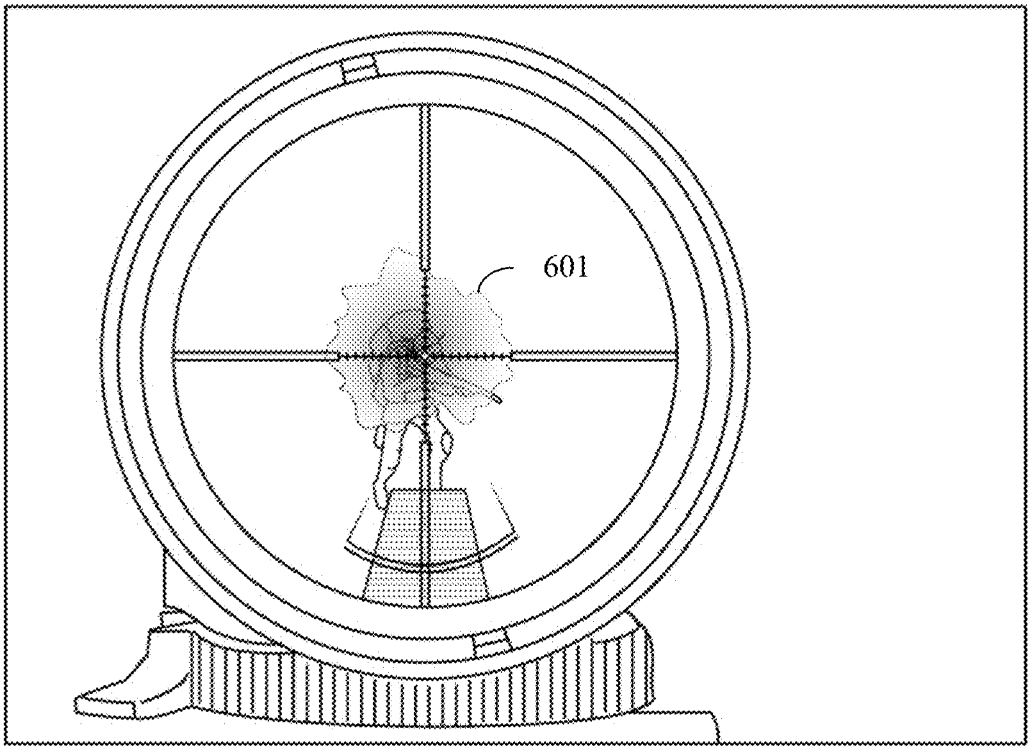
FIG. 6 is a schematic diagram of a prop special effect in a virtual scene according to an embodiment of this disclosure.
Figure 6:
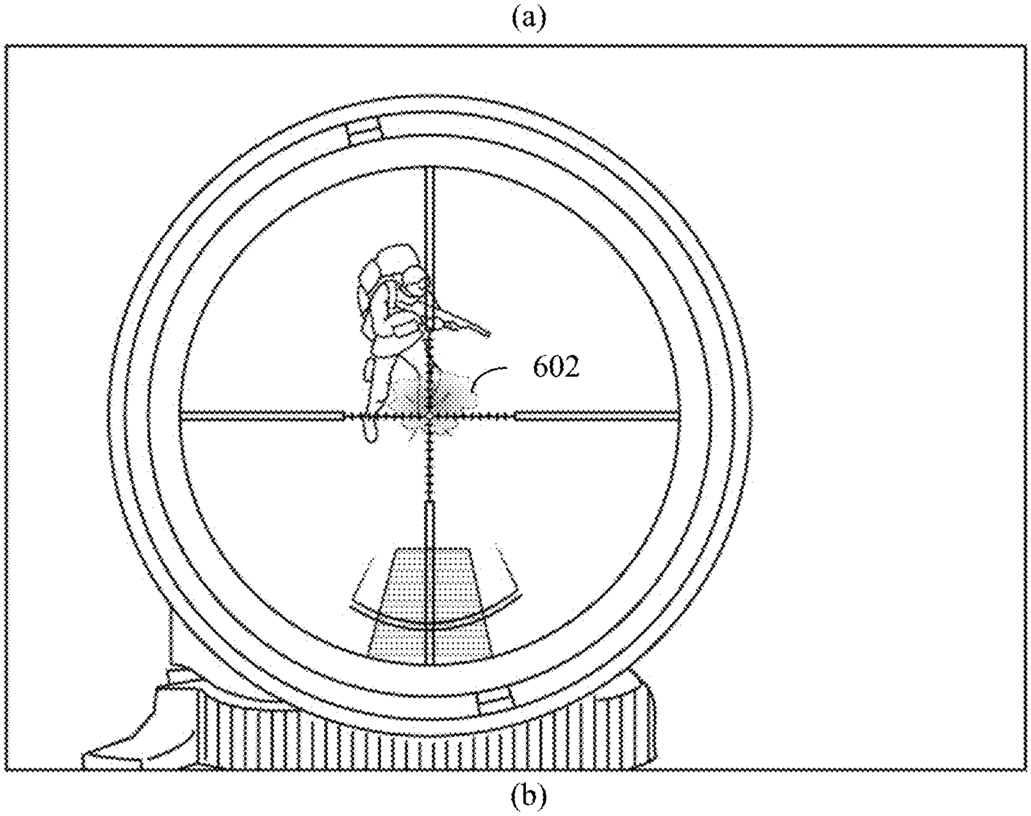

FIG. 6 is a schematic diagram of a prop special effect in a virtual scene according to an embodiment of this disclosure. Referring to FIG. 6, in a case that the ADS aim mode is used, the user controls the first virtual object to open the optical sight for shooting; and in a case that the head of the second virtual object is hit by the launcher launched by the first virtual object using the virtual prop, the initial scaling ratio is determined based on the steps A1 and A2. After the final scaling ratio of the special effect is determined in the following steps 303-304, as shown in (a), a prop special effect 601 that the head is hit is played according to the scaling ratio of the special effect. Correspondingly, in a case that legs of the second virtual object are hit by the launcher launched by the first virtual object using the virtual prop, the initial scaling ratio is determined based on the steps A1 and A2. After the final scaling ratio of the special effect is determined in the following steps 303-304, as shown in (b), a prop special effect 602 that the legs are hit is played according to the scaling ratio of the special effect. It may be seen that in a case that the magnification ratio of the optical sight is the same, and the distance between the first virtual object and the second virtual object is the same, the prop special effect 601 that the head is hit is significantly greater than the prop special effect 602 that the legs are hit. That is, the scaling ratio for the prop special effect in a case that the head is hit is greater than the scaling ratio for the prop special effect in a case that the legs are hit, which is convenient for the user to judge which body part of the second virtual object hit this time according to the significance degree of the prop special effect so as to improve the information acquisition efficiency of the user.

It should be noted that, in the above steps A1 and A2, the situation that the launcher hits the second virtual object is shown. In a case that different distance scaling curves are determined according to different hit body parts of the second virtual object, the initial scaling ratio of this time is further obtained from the determined distance scaling curve. In some embodiments, in a case that different distance scaling curves are not distinguished for different body parts of the second virtual object, the second virtual object may be regarded as the virtual body of a special form, and the initial scaling ratio is determined based on the processing logic of the following situation II.

Situation II: the target object is a virtual body that is not controlled by the player.

The virtual body that is not controlled by the player and serves as the target body is taken as an example for description. That is, the target object hit by the launcher launched by the first virtual object using the virtual prop, and the target body may be a wall, a shelter, a board, a tree, a vehicle, a window, a baffle, etc. The target body is not specifically limited by the embodiment of this disclosure.

In some embodiments, the server side may configure a uniform target scaling curve for all virtual bodies, and the terminal pulls and caches the target scaling curve from the server. The target scaling curve represents a relationship between the scaling ratio of the special effect and the second distance. The second distance refers to a distance between the first virtual object and the virtual body, i.e. the distance between the first virtual object and the target body.

Figure 7:
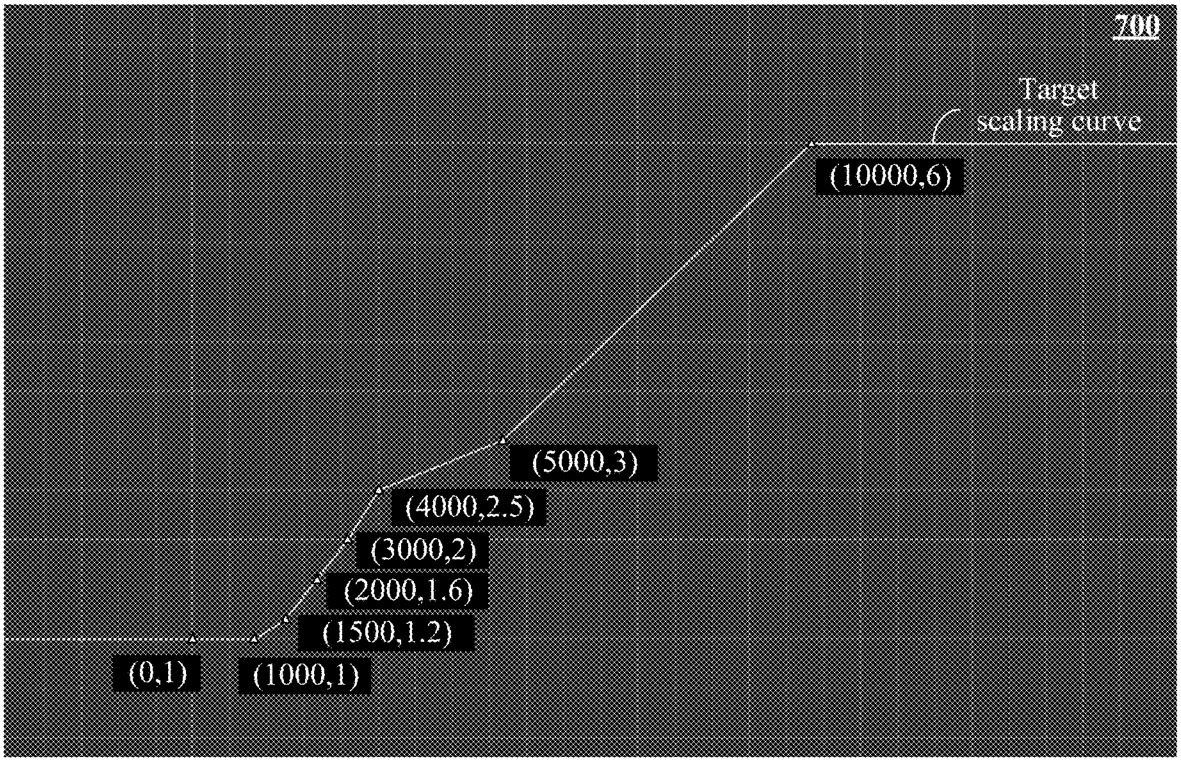
FIG. 7 is a schematic diagram of a target scaling curve according to an embodiment of this disclosure.

FIG. 7 is a schematic diagram of a target scaling curve according to an embodiment of this disclosure. As shown in 700, the target scaling curve provided in a case that the virtual body (such as the target body) is hit is shown. A horizontal axis of the target scaling curve represents the distance between the first virtual object and the target body, and a longitudinal axis of the target scaling curve represents the scaling ratio of the prop special effect in a case that the target body is hit. It may be seen that the scaling ratio is still positively correlated with the distance between the first virtual object and the target body. For example, a coordinate point (3000, 2) in the target scaling curve represents that the scaling ratio is 2 in a case that the distance between the first virtual object and the target body is 3000 cm (i.e. 30 m), that is, the prop special effect is magnified to 2 times from the standard size. For another example, a coordinate point (5000, 3) in the target scaling curve represents that the scaling ratio is 3 in a case that the distance between the first virtual object and the target body is 5000 cm (i.e. 50 m), that is, the prop special effect is magnified to 3 times from the standard size.

In some embodiments, in a case of detecting that the launcher hits the target body, the terminal determines the initial scaling ratio matched with the distance based on the target scaling curve. The terminal can obtain a target scaling function corresponding to the target scaling curve based on the target scaling curve. Then, the terminal may output the initial scaling ratio matched with the distance by substituting the distance between the first virtual object and the target body into the target scaling function. For example, the target scaling function is a function mapping relationship taking the distance as an independent variable and the scaling ratio as a dependent variable. Then, after the distance between the first virtual object and the target body is determined, the dependent variable, i.e. the scaling ratio may be calculated and outputted by substituting the distance into the independent variable in the target scaling function, and then the scaling ratio outputted by the target scaling function is used as the initial scaling ratio.

In the foregoing situation II, how to determine the initial scaling ratio matched with the distance in a case that the launcher hits the target body is shown. In some embodiments, the server side may configure different target scaling curves for different virtual bodies of different materials, and generate a correlation between the body material and the target scaling curve, so that the terminal may load and cache a plurality of target scaling curves from the server and the correlation. The terminal determines the target scaling curve correlated with the material according to the cached correlation based on the material of the target body hit by the launcher this time, and further determines the initial scaling ratio matched with the distance between the first virtual object and the target body based on the obtained target scaling curve. The way for determining the target scaling curve and the initial scaling ratio is similar to that in the steps A1 and A2, which is not repeated herein.

In the foregoing situations I and II, different possible implementations in which the initial scaling ratio is determined based on the distance between the first virtual object and the target object in a case that the target object hit by the launcher is the second virtual object and the target body are provided respectively.

In some embodiments, in a case that the ADS aim mode is adopted, the following steps 303-304 need to be performed, and the initial scaling ratio is further adjusted by considering the magnification ratio of the optical sight, so that the prop special effect is prevented from blocking too much view after being magnified by the optical sight.

In some other embodiments, in a case that the hip fire mode is adopted, that is, in a case that the optical sight is not opened for shooting, the initial scaling ratio determined in the step 302 is directly used as the scaling ratio of the special effect, and the step 305 is performed. The adopted shooting mode is not specifically limited by the embodiments of this disclosure.

Figure 8:
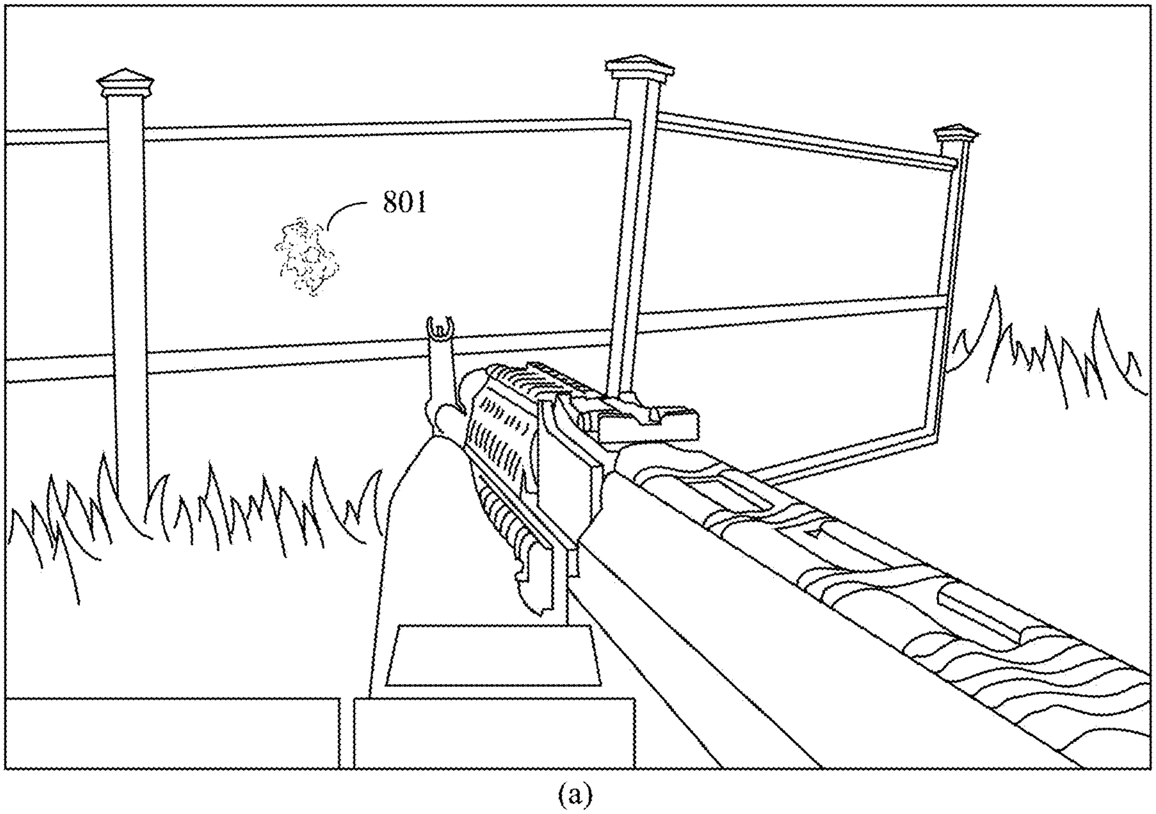
FIG. 8 is a schematic diagram of a prop special effect in a virtual scene according to an embodiment of this disclosure.
Figure 8:
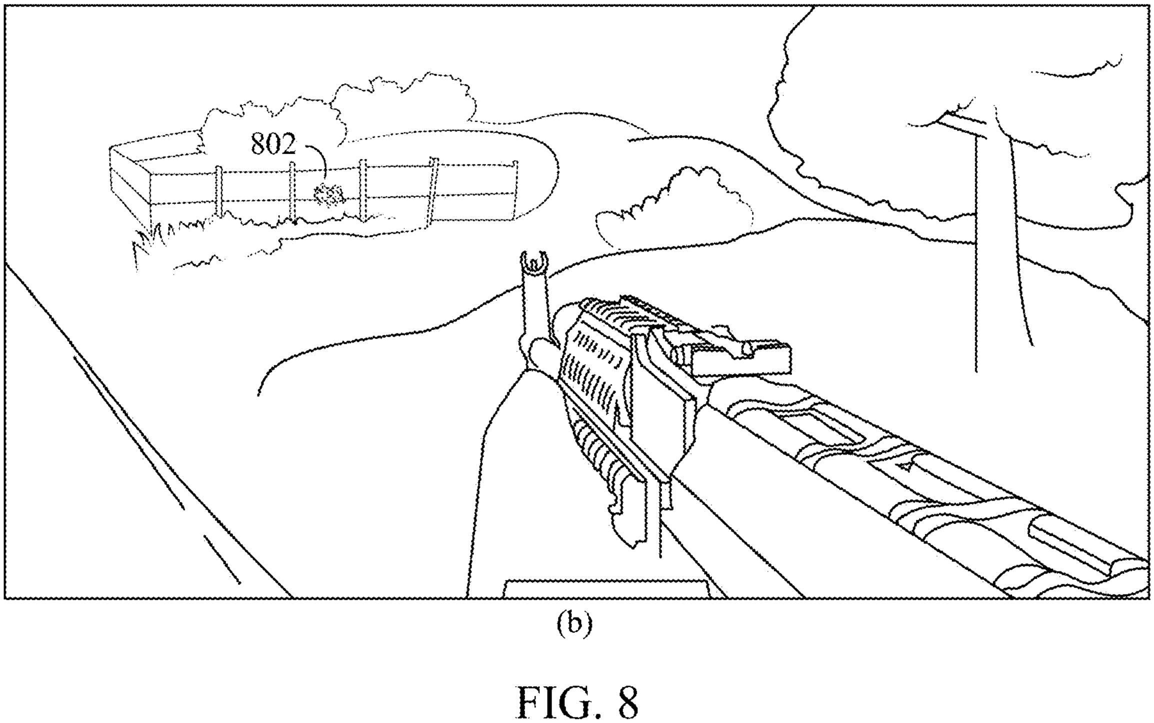

FIG. 8 is a schematic diagram of a prop special effect in a virtual scene according to an embodiment of this disclosure. Referring to FIG. 8, FIG. 8 shows that in the hip fire mode, the prop special effect is played in different scaling ratios of the special effect in the virtual scene according to different distances between the first virtual object and the target body. In the hip fire mode, since the optical sight is not opened, it is unnecessary to perform the steps 303-304 to consider an adjustment factor. At the same time, because the target body rather than the second virtual object is hit, different body parts involved in the situation I do not need to be considered. Therefore, in FIG. 8, the final scaling ratio of the special effect can be determined only by considering the distance between the first virtual object and the target body. As shown in (a), in a case of close-range shooting, since the distance between the first virtual object and the target body (such as a wooden wall), the value of the basic scaling coefficient of the target object is relatively large according to the near-big and far-small vision principle, and the scaling ratio of the special effect is positively correlated with the distance. Therefore, the value of the determined scaling ratio of the special effect is small, and the prop special effect 801 that is finally played in the virtual scene only occupies a small portion of an upper half wall of the wooden wall. Correspondingly, as shown in (b), in a case of long-range shooting, since the distance between the first virtual object and the target body (such as a wooden wall) is relatively long, the value of the basic scaling coefficient of the target body is relatively small, and the scaling ratio of the special effect is positively correlated with the distance. Therefore, the value of the determined scaling ratio of the special effect is large, and the display size of the prop special effect 802 that is finally played in the virtual scene is reduced on the basis of the basic scaling coefficient, and then appropriately magnified by the scaling ratio of the special effect. Schematically, although the prop special effect 802 is affected by the basic scaling coefficient compared with the prop special effect 801, the display size is reduced slightly but appropriately increased under the influence of the scaling ratio of the special effect. It may be seen that the prop special effect 802 steps over the upper half wall and the lower half wall of the wooden wall, and compared with the wooden wall, the area ratio occupied by the prop special effect is increased.

In some embodiments, in a case that there is an obstacle between the first virtual object and the target object (such as the second virtual object or the target body), there may be the phenomenon that the obstacle blocks the prop special effect. The terminal then may further adjust the scaling ratio or display position of the prop special effect to prevent the prop special effect from being blocked by the obstacle, which leads to that the user cannot know the information of the target object hit by the launcher, so that the information acquisition efficiency can also be improved. For example, a launching trajectory of the launcher is a parabola, and the launcher hits the target object during the movement to the ending point along the parabola. However, the sight of the first virtual object in a case of observing the target object is a straight line, it is possible that the prop special effect displayed on the target object may be blocked by the obstacle in a case that there is the obstacle between the first virtual object and the target object, thereby hindering the information transmission.

On this basis, the terminal may determine an expansion coefficient for the initial scaling ratio based on the size of the obstacle. The terminal determines the initial scaling ratio based on the expansion coefficient and the distance. The server side may pre-define a function mapping equation of the size and expansion coefficient of the obstacle. After loading and caching the function mapping equation, in a case of detecting that there is the obstacle between the first virtual object and the target object, the terminal determines the size of the obstacle, and inputs the size of the obstacle into the function mapping equation to output the expansion coefficient of this time. The expansion coefficient is any value greater than or equal to 1. Based on the initial scaling ratio determined originally based on the situation I or situation II, the terminal multiplies the original initial scaling ratio by the expansion coefficient to obtain the adjusted initial scaling ratio.

Schematically, for the situation that the second virtual object is hit involved in the situation I, after the original initial scaling ratio is determined based on the hit body part and the distance between the first virtual object and the second virtual object, the original initial scaling ratio is multiplied by the expansion coefficient determined based on the size of the obstacle to obtain the adjusted initial scaling ratio. In other words, it is equivalent to that the adjusted initial scaling ratio is obtained based on the body part hit this time, the distance between the first virtual object and the second virtual object, and the expansion coefficient determined based on the size of the obstacle.

Schematically, for the situation that the target body is hit involved in the situation II, after the original initial scaling ratio is determined based on the distance between the first virtual object and target body, the terminal multiplies the original initial scaling ratio by the expansion coefficient determined based on the size of the obstacle to obtain the adjusted initial scaling ratio. In other words, it is equivalent to that the adjusted initial scaling ratio is obtained based on the distance between the first virtual object and the target body, and the expansion coefficient determined based on the size of the obstacle.

In the above process, in a case that there is the obstacle between the first virtual object and the target object, the prop special effect can be prevented from being blocked by the obstacle by further increasing the original initial scaling ratio by the expansion coefficient, which leads to that the user cannot know the information of the target object that is already hit by the launcher, so that the information acquisition efficiency can also be improved.

In some embodiments, in a case that there is the obstacle between the first virtual object and the target object, the terminal may also adjust the display position of the prop special effect based on the position of the obstacle. For example, the terminal translates the display position of the prop special effect in a specified direction until the prop special effect is no longer blocked by the obstacle. The specified direction may be straight up, straight down, horizontal left, horizontal right, or any angle, which is not specifically limited by the embodiments of this disclosure.

In the above process, by adjusting the display position of the prop special effect until the prop special effect is no longer blocked by the obstacle, the prop special effect can be prevented from being blocked by the obstacle, which ensures that the prop special effect played in a case that the target object is hit by the launcher can be seen by the user, thereby further improving the information acquisition efficiency of the user.

303: The terminal determines an adjustment factor based on a field of view of the optical sight in a case that the first virtual object opens the optical sight, and the adjustment factor is positively correlated with the field of view.

In some embodiments, since the optical sight is configured to assist the first virtual object to aim at the shooting target, the optical sight usually may have certain magnification ratio, and the magnification ratio may act on the field of view that can be observed by the user. Therefore, the field of view of the optical sight is determined based on the magnification ratio of the optical sight. After the field of view of the first virtual object is switched to the field of view of the optical sight, since a body or an object in the field of view is magnified by the optical sight, the general field of view may be reduced, that is, FoV may be reduced. In other words, the smaller the FoV, the smaller the field of view, the greater the magnification ratio of the optical sight, and the better the magnification effect; and otherwise, the greater the FoV, the larger the field of view, the smaller the magnification ratio of the optical sight, and the poorer the magnification effect.

The magnification ratio of the optical sight is correlated with the type of the optical sight. For example, as shown in table 1, the magnification ratio of a two-times scope is 2, and the magnification ratio of the four-times scope is 4, etc. The above description is an exemplary explanation of the magnification ratio and type of the optical sight, and the magnification ratio and type of the optical sight may also have other configuration relationship, which is not specifically limited by the embodiments of this disclosure.

In a case that the first virtual object opens the optical sight, since the initial scaling ratio of the target object far away from the first virtual object is relatively large (because the initial scaling ratio is positively correlated with the distance), the magnified prop special effect may block the whole optical sight or block a large area in the optical sight in a case that the magnified prop special effect is to be secondarily magnified by the optical sight, which may cause an adverse impact on judging the situation of the game. Therefore, in a case that the optical sight is opened, it may also necessary to determine an adjustment factor to reduce the initial scaling ratio determined in the step 302.

In some embodiments, the server side pre-defines a view scaling curve, and the terminal pulls and caches the view scaling curve from the server. The view scaling curve represents a relationship between the adjustment factor of the scaling ratio of the special effect and the field of view of the optical sight.

Figure 9:
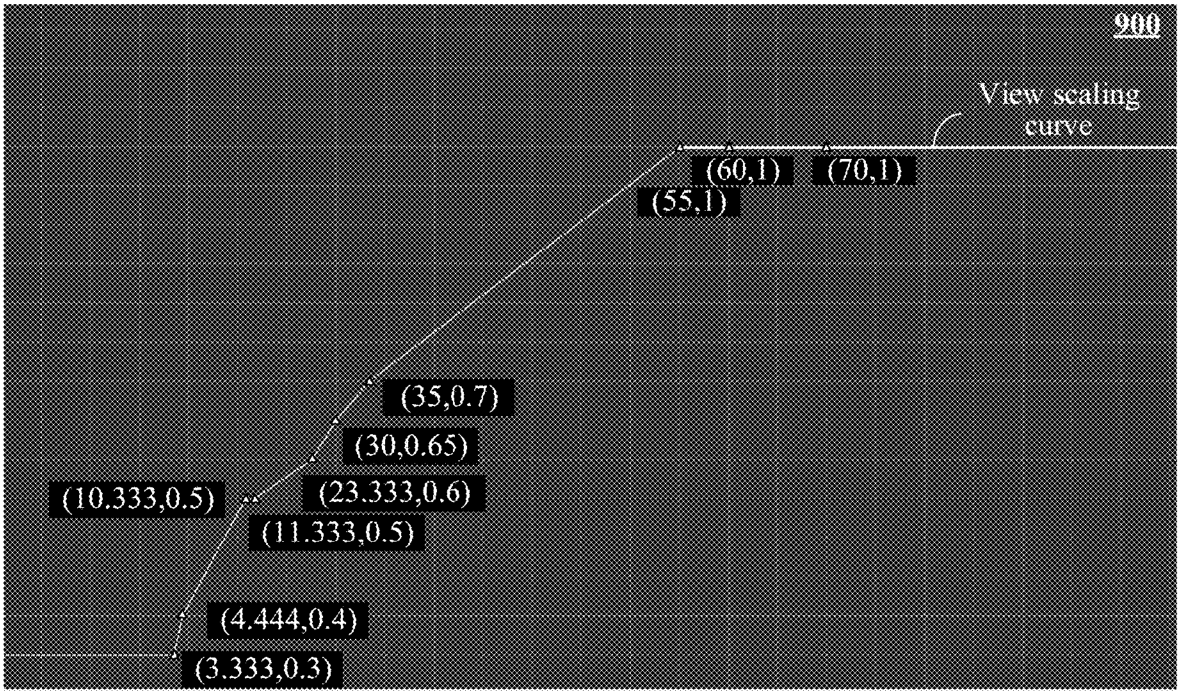
FIG. 9 is a schematic diagram of a target scaling curve according to an embodiment of this disclosure.

FIG. 9 is a schematic diagram of a target scaling curve according to an embodiment of this disclosure. As shown in 900, a view scaling curve is shown. The horizontal axis of the view scaling curve represents FoV (equivalent to the field of view of the optical sight) of the first virtual object after opening the optical sight, and the longitudinal axis of the view scaling curve represents the adjustment factor for the scaling ratio of the prop special effect under the corresponding FoV. It may be seen that the adjustment factor is still positively correlated with FoV of the first virtual object after opening the optical sight. For example, a coordinate point (11.333, 0.5) in the view scaling curve represents that the adjustment factor is 0.5 in a case that the FoV of the first virtual object after opening the optical sight is 11.333, that is, the prop special effect is reduced to half of the initial scaling ratio. For another example, a coordinate point (55, 1) in the view scaling curve represents that the adjustment factor is 1 in a case that the FoV of the first virtual object after opening the optical sight is 55, that is, the initial scaling ratio of the prop special effect is kept unchanged.

In some embodiments, in a case of detecting that the optical sight is already opened, the terminal determines the magnification ratio of the optical sight based on the type of the optical sight opened this time. The terminal determines the field of view of the optical sight based on the magnification ratio of the optical sight. Then the terminal determines the adjustment factor matched with the field of view of the optical sight based on the view scaling curve. The terminal can obtain the view scaling function corresponding to the view scaling curve based on the view scaling curve. Then, the terminal may output the adjustment factor matched with the FoV by substituting the FoV of the first virtual object after opening the optical sight into the view scaling function. For example, the view scaling function is a function mapping relationship with the FoV as an independent variable and the adjustment factor as a dependent variable, so that the dependent variable, i.e. the adjustment factor may be calculated and outputted by substituting the FoV into the independent variable in the view scaling function after the FoV of the first virtual object after opening the optical sight is determined.

304: The terminal determines a scaling ratio of the special effect based on the initial scaling ratio and the adjustment factor.

In some embodiments, the terminal multiplies the initial scaling ratio by the adjustment factor to obtain the scaling ratio of the special effect. The server side may also define a conversion formula between the initial scaling ratio and the adjustment factor, and the scaling ratio of the special effect, and may output the final scaling ratio of the special effect by inputting the initial scaling ratio and the adjustment factor into the conversion formula. A way for obtaining the scaling ratio of the special effect is not specifically limited by the embodiments of this disclosure.

In an example, the hit target object being the second virtual object is taken as an example for description. It is assumed that the standard size of the prop special effect is equal to a palm size of the second virtual object, and then the prop special effect is affected by the near-big and far-small view principle in a case of long-range shooting. It is assumed that the basic scaling coefficient for the second virtual object and the prop special effect is 0.5, the basic scaling coefficient acts both on the second virtual object and the prop special effect displayed based on the second virtual object. Therefore, the size of the second virtual object and the prop special effect is both reduced by ½. At this time, the prop special effect with the size of 0.5 times of the palm size is supposed to be played, but in the embodiment of this disclosure, the distance scaling curve corresponding to the body part (such as the head) hit this time may be inquired for the prop special effect to obtain an initial scaling ratio positively correlated with the distance. For example, the initial scaling ratio inquired from the distance scaling curve corresponding to the head is 1.5. Since the prop special effect magnified by optical sight in the ADS aim mode may block the view too much, the adjustment factor corresponding to the optical sight of the current magnification ratio is determined as 0.8, and the scaling ratio of the special effect is determined as 1.2 based on the initial scaling ratio (1.5) and the adjustment factor (0.8). Therefore, the scaling ratio for the prop special effect is a product (0.6) of the scaling ratio (1.2) of the special effect and the basic scaling coefficient (0.5). Therefore, the prop special effect with the size of 0.6 times of the palm size is finally played. Compared with the method in which the prop special effect is scaled and displayed according to the basic scaling coefficient, the above method can appropriately increase the display size (that is increased from 0.5 times to 0.6 times) of the prop special effect played in a case of long-range shooting, so that the prop special effect can be prevented from being ignored in a case of long-range shooting. By adopting the above method, even in a case of long-range shooting, the user can learn whether the launcher launched this time hits the target object or not by playing the prop special effect, which greatly improves the information acquisition efficiency of the user, and is also convenient for the user to decide whether the second launcher is to be launched and the subsequent confrontation strategy, thereby greatly improving the human-computer interaction efficiency.

In the foregoing steps 302-304, a possible implementation in which the scaling ratio of the special effect is determined based on the field of view of the optical sight and the distance in a case that the first virtual object opens the optical sight is shown. In a case that the first virtual object does not open the optical sight, the initial scaling ratio determined in the step 302 may be directly used as the final scaling ratio of the special effect, which can simplify the process for determining the scaling ratio of the special effect, thereby saving the processing resource of the terminal.

Figure 10:
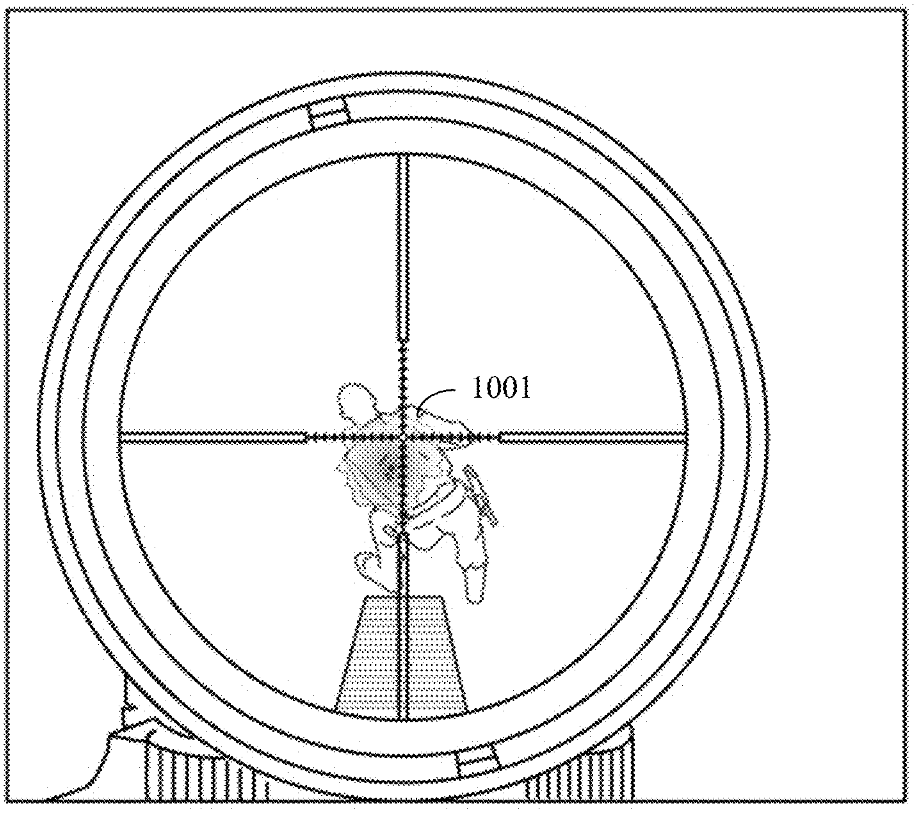
FIG. 10 is a schematic diagram of a prop special effect in a virtual scene according to an embodiment of this disclosure.
Figure 10:
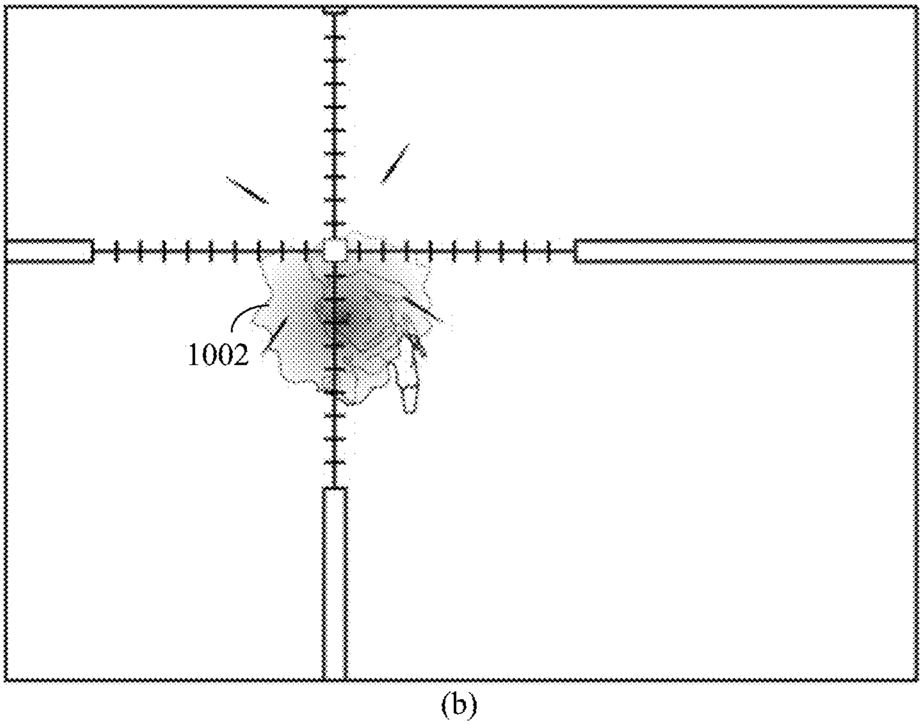

FIG. 10 is a schematic diagram of a prop special effect in a virtual scene according to an embodiment of this disclosure. Referring to FIG. 10, FIG. 10 shows that in a case that the optical sight is opened, the prop special effect is played in different scaling ratios of the special effect in the virtual scene according to different FoV after the first virtual object opens the optical sight. In a case that the optical sight is opened, it is assumed that the distance between the first virtual object and the target object is the same, and the same target object is hit (in a case that the target object is the second virtual object, the same body part is hit), and there is no obstacle between the first virtual object and the target object. As shown in (a), in a case that the high-power optical sight is opened, because of large magnification ratio and good magnification effect of the high-power optical sight, the FoV (for example, FoV=11.333) is small after the first virtual object opens the optical sight, and at this time, the adjustment factor is positively correlated with the FoV. The value of the adjustment factor is small, which leads to that the determined scaling ratio of the special effect is small, the display size of the prop special effect 1001 played in the virtual scene is also small. For example, the prop special effect 1001 only covers the upper half body of the second virtual object. Correspondingly, as shown in (b), in a case that the low-power optical sight is opened, because of small magnification ratio and poor magnification effect of the low-power optical sight, the FoV (for example, FoV=55) is large after the first virtual object opens the optical sight, and at this time, the adjustment factor is positively correlated with the FoV. Therefore, the value of the adjustment factor is large, which leads to that the determined scaling ratio of the special effect is large, and the display size of the prop special effect 1002 played in the virtual scene is also relatively large. For example, the prop special effect 1002 not only covers the upper half body of the second virtual object, but also covers one portion of the lower half body, and also extends to a peripheral space of the second virtual object.

In the above process, the prop special effect that is magnified by the optical sight is reduced in a certain ratio by using the adjustment factor, which can prevent the prop special effect from being dually magnified by the long-range shooting and the optical sight, and prevent the field of view of the optical sight from being greatly blocked by the prop special effect, thereby optimizing the playing effect of the prop special effect, and improving the use feeling of the virtual prop in a case of long-range shooting when the optical sight is opened.

305: The terminal determines the prop special effect associated with the object type based on the object type of the target object.

In some embodiments, the terminal configures different prop special effects for different virtual props. Further, a plurality of different prop special effects are further configured for each virtual prop according to different types of the target object hit by the virtual prop, so that the user can determine which type of target object is hit by which type of virtual prop this time according to the played prop special effect. For example, the prop special effect that an iron sheet is hit is significantly different from the prop special effect that wood is hit. For another example, the prop special effect that a body is hit is significantly different from the prop special effect that other virtual objects are hit, so that different types of target objects are quickly distinguished.

In some embodiments, the server side pre-configures the correlation between the object type and the prop special effect. For example, the correlation refers to a mapping relationship between a type identifier of the object type and a special effect identifier of the prop special effect. In this way, the terminal may determine the object type of the target object hit this time after loading and caching the mapping relationship from the server, and further maps the type identifier of the object type to the special effect identifier of the corresponding prop special effect based on the mapping relationship. Then, the terminal takes the mapped special effect identifier as an index to inquire the prop special effect indicated by the special effect identifier from various cached prop special effects bound to the virtual prop used this time.

Figure 11:
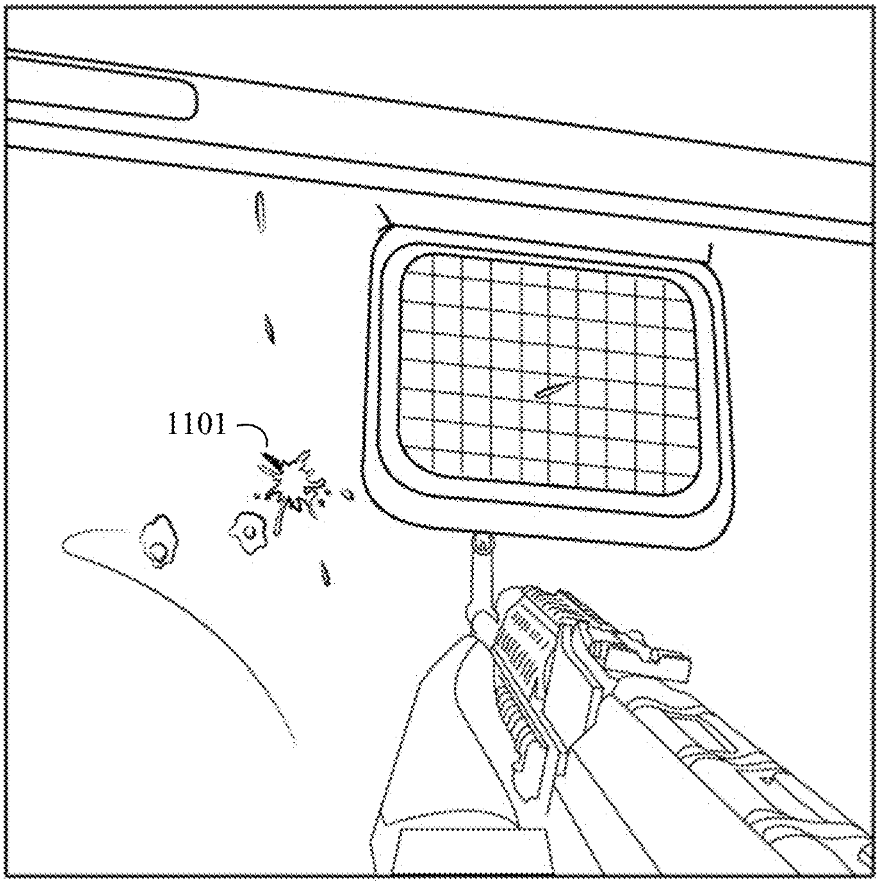
FIG. 11 is a schematic diagram of a prop special effect in a virtual scene according to an embodiment of this disclosure.
Figure 11:
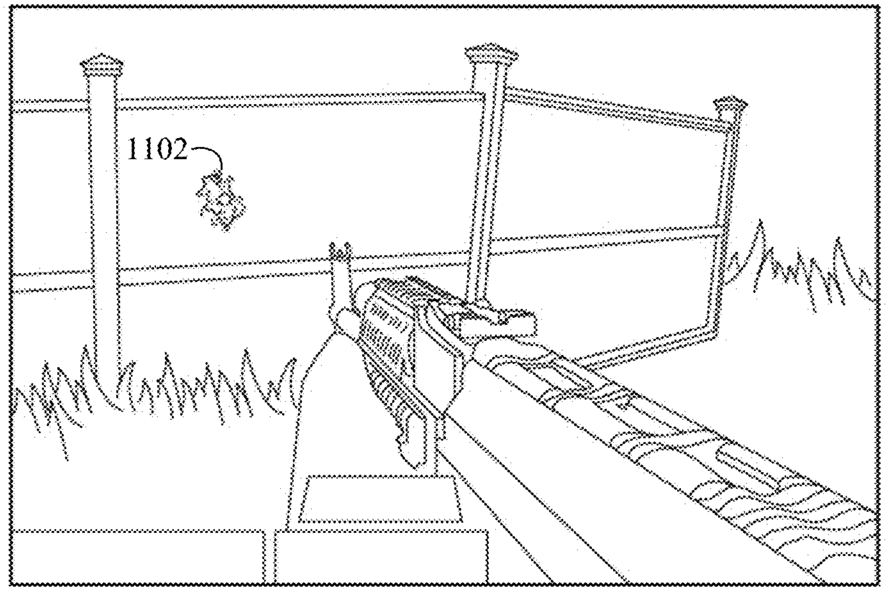

FIG. 11 is a schematic diagram of a prop special effect in a virtual scene according to an embodiment of this disclosure. Referring to FIG. 11, FIG. 11 shows that different prop special effects are played in the virtual scene in a case that different types of target objects are hit. As shown in (a), the prop special effect 1101 played in the virtual scene in a case that the iron sheet is hit by the launcher is shown; and correspondingly, as shown in (b), the prop special effect 1102 played in the virtual scene in a case that the wood is hit is shown. It may be seen from FIG. 11 that the prop special effect 1101 played in a case that the iron sheet is hit is obviously different from the prop special effect 1102 played in a case that the wood is hit, which is convenient for the user to clearly distinguish the object type of the target object hit this time, so that the information acquisition efficiency and the human-computer interaction efficiency can be further improved.

306: The terminal plays the prop special effect in the scaling ratio of the special effect based on the target object.

In some embodiments, because of the near-big and far-small vision principle, in a case that the target object is observed within the field of view of the first virtual object, a basic scaling coefficient for the target object may be determined based on the distance between the first virtual object and the target object. The basic scaling coefficient is negatively correlated with the distance. That is, the basic scaling coefficient may be reduced with the increase of the distance, and the basic scaling coefficient may increase with the decrease of the distance, which can ensure that the near-big and far-small vision principle is obeyed in a case that the target object is observed within the field of view of the first virtual object.

In some embodiments, the terminal determines the prop special effect associated with the virtual prop and the standard size of the prop special effect. Then the terminal adjusts the standard size of the prop special effect based on the basic scaling coefficient for the target object and the scaling ratio of the special effect determined in step 202 to obtain the display size of this time. Then, the terminal plays the prop special effect in the display size.

Since the virtual prop hits the target object, the prop special effect is played in the display size based on the target object. The prop special effect may disappear automatically from the virtual scene after being played. For example, the prop special effect is played on the target object. In a case that the prop special effect is played, the prop special effect may be played in a floating layer, and the floating layer is displayed at an upper layer of the target object.

In the above steps 305-306, a possible implementation in which the prop special effect of the virtual prop is played based on the scaling ratio of the special effect is provided. That is, the prop special effect associated with the object type played this time is selected according to different object type of the hit target object. In some other embodiments, the prop special effect played this time may also be associated only with the virtual prop, but is irrelevant to the object type of the hit target object. That is, no matter which type of target object is hit in a case that the virtual prop is unchanged, the same prop special effect is played, so that it is unnecessary to perform the step 305, the process for playing the prop special effect can be simplified, and the processing resource of the terminal can be saved.

In the foregoing process, in a case of long-range shooting, the display size of the prop special effect finally played by the terminal is reduced by the basic scaling coefficient according to the near-big and far-small vision principle, and then magnified appropriately under the control of the scaling ratio of the special effect. In other words, the basic scaling coefficient acts both on the target object and the prop special effect displayed based on the target object. The scaling ratio of the special effect acts only on the prop special effect displayed based on the target object, so that the prop special effect is inconsistent with the scaling effect of the target object. The prop special effect and the target object are originally both affected by the basic scaling coefficient and are to be scaled according to the same ratio. However, in the embodiment of this disclosure, the target object is scaled still according to the basic scaling coefficient, but the prop special effect may be affected by both the basic scaling coefficient and the scaling ratio of the special effect. The prop special effect is adjusted and magnified appropriately by the scaling ratio of the special effect based on the reduction by the basic scaling coefficient.

Compared with the method in which the prop special effect is scaled and displayed according to the basic scaling coefficient, the method provided in the embodiment of this disclosure can increase the display size of the prop special effect played in a case of long-range shooting, so that the prop special effect can be prevented from being ignored in a case of long-range shooting. According to the above solution, even in a case of long-range shooting, the user can learn whether the launcher launched this time hits the target object or not by playing the prop special effect, which greatly improves the information acquisition efficiency of the user, is also convenient for the user to decide whether the second launcher is to be launched and the subsequent confrontation strategy, thereby greatly improving the human-computer interaction efficiency.

Figure 12:
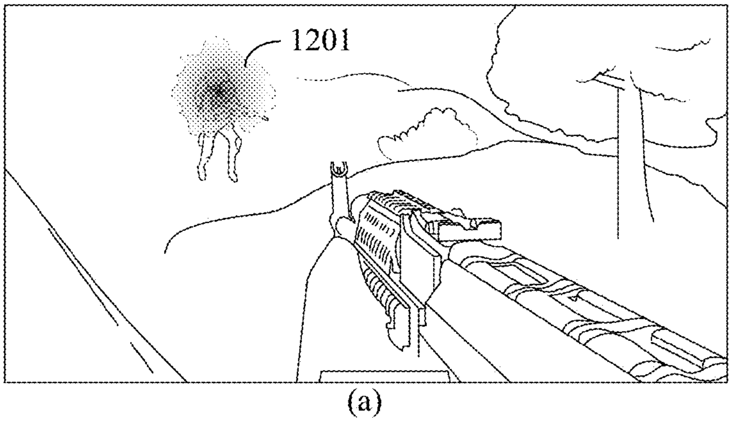
FIG. 12 is a schematic diagram of a prop special effect in a virtual scene according to an embodiment of this disclosure.
Figure 12:
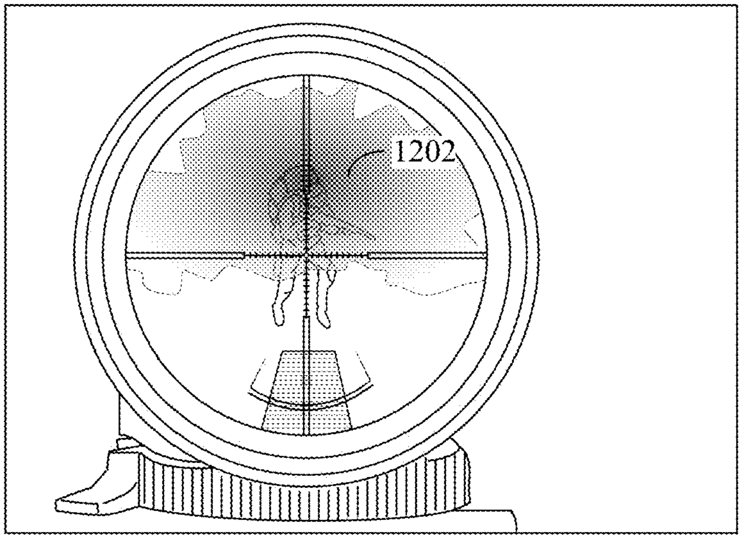
Figure 12:
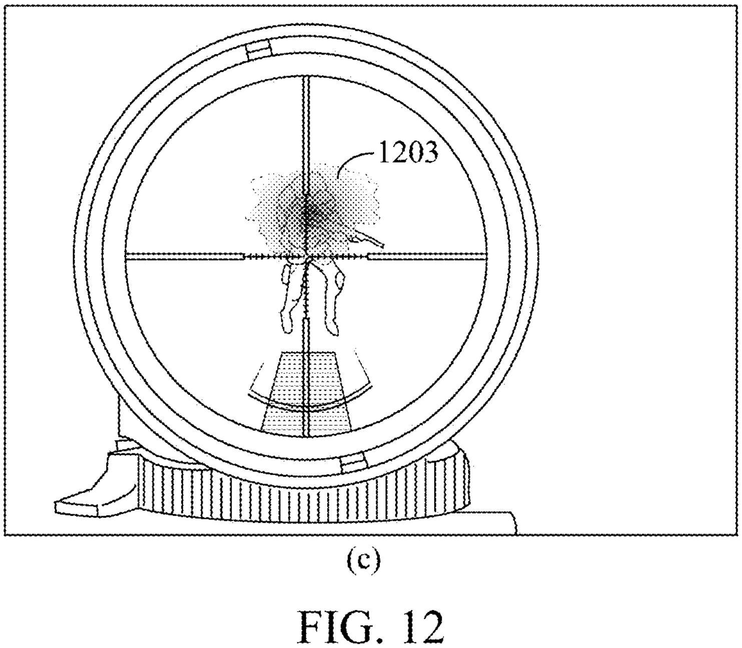

FIG. 12 is a schematic diagram of a prop special effect in a virtual scene according to an embodiment of this disclosure. Referring to FIG. 12, the target object that is hit by the launcher and is the second virtual object is taken as an example for description. As shown in (a), the prop special effect 1201 played in a case of long-range shooting in a hip fire mode is shown. In a case that the optical sight is not opened, since the distance between the first virtual object and the second virtual object is long, on the basis of near-big and far-small vision principle, the size of the prop special effect 1201 is appropriately increased, so that the prop special effect 1201 can be seen clearly in the hip fire mode, and may not be ignored because of long distance. As shown in (b), the prop special effect 1202 played in a case of long-range shooting in a ADS aim mode is shown. Compared with (a), the distance between the first virtual object and the second virtual object is unchanged, it may be seen that the size of the prop special effect 1202 is increased to prevent the special effect from being unclear to see because of long distance in (a), the prop special effect 1202 that is already magnified after the optical sight is opened may be secondarily magnified by the optical sight. Therefore, the prop special effect 1202 may severely block the view in the field of view of the optical sight. As shown in (c), another prop special effect 1203 played during the long-range shooting in the ADS aim mode is shown, which is also the prop special effect displayed in the ADS aim mode compared with (b). The distance between the first virtual object and the second virtual object is unchanged. Therefore, the size of the second virtual object in (b) and (c) is kept unchanged, but the adjustment factor determined based on the FoV after the optical sight is opened is obtained in the above steps 303-304, and the prop special effect after the optical sight is opened is reduced based on the adjustment factor, so that the prop special effect is prevented from blocking too much view after being secondarily magnified. It may be seen that after the initial scaling ratio determined based on the distance between the first virtual object and the second virtual object is adjusted based on the adjustment factor determined by the FoV after the optical sight is opened, the prop special effect 1203 displayed within the field of view of the optical sight may be adjusted back to an appropriate display size, which may neither block the view too much nor be easily ignored because of being reduced.

In the above process, after the optical sight is opened, the prop special effect that is magnified originally in the hip fire mode is appropriately reduced by using the adjustment factor determined based on the FoV after the optical sight is opened, so that the prop special effect can be prevented from blocking the view too much after being dually magnified by the distance and the optical sight, and the prop special effect display logic and display effect in the ADS aim mode can be optimized in a case that the prop special effect is displayed based on the method provided in the embodiments of this disclosure.

In some embodiments, besides the visual effect, the prop special effect may also include a hit sound effect. Therefore, in a case that the prop special effect includes the hit sound effect, the terminal may also determine a volume adjustment coefficient based on the distance between the first virtual object and the target object. The terminal adjusts a playing volume of the hit sound effect based on the volume adjustment coefficient.

In some embodiments, the server side may be pre-configured with a volume control curve. The volume control curve represents a relationship between the volume adjustment coefficient and the distance between the first virtual object and the target object. In this way, after pulling and caching the volume control curve, the terminal can determine the volume adjustment coefficient matched with the distance based on the volume control curve, and then adjusts the playing volume of the hit sound effect played this time based on the determined volume adjustment coefficient. The above method can simulate auditory experience that the volume is small in the distance and loud nearby, so that an immersive atmosphere can be provided, the naturalness of the shooting game can be improved, and the game experience of the user can be optimized.

In some embodiments, in a case that the hit target object is the second virtual object, the volume adjustment coefficient may also be determined based on the hit body part of the second virtual object and the distance between the first virtual object and the second virtual object. For example, in a case that the distance between the first virtual object and the second virtual object is the same, the volume adjustment coefficient in a case that the hit body part is the head is set to be greater than the volume adjustment coefficient in a case that the body part other than the head is hit. Since excellent design skills are usually needed for accurately controlling the launcher to hit the head, by configuring a greater volume adjustment coefficient, the hearing sense in a case that the launcher hits the head can be enhanced, thereby optimizing the game experience of the user.

Any combination of the foregoing technical solutions may be used to obtain an embodiment of this disclosure. Details are not described herein.

According to the method provided in the embodiments of this disclosure, in a case that the launcher of the virtual prop hits the target object, the scaling ratio of the special effect that is positively correlated with the distance is determined based on the distance between the first virtual object and the target object hit this time, and the prop special effect is played in the determined scaling ratio of the special effect, so that even in a case of long-range shooting, the prop special effect that is reduced originally under the near-big and far-small vision principle is magnified by increasing the scaling ratio of the special effect, and the prop special effect played in the virtual scene is more prominent, thereby increasing the amount of information carried in the virtual scene, and improving the information acquisition efficiency. Since the phenomenon that the prop special effect is easy to ignore in a case of long-range shooting is improved, the use feeling of the virtual prop is also optimized, thereby improving the human-computer interaction efficiency.

In the previous embodiment, the process of the prop special effect display method is introduced in detail for different situations. In the embodiment of this disclosure, the display process of the prop special effect is introduced in detail by taking the long-range shooting scene as an example.

Figure 13:
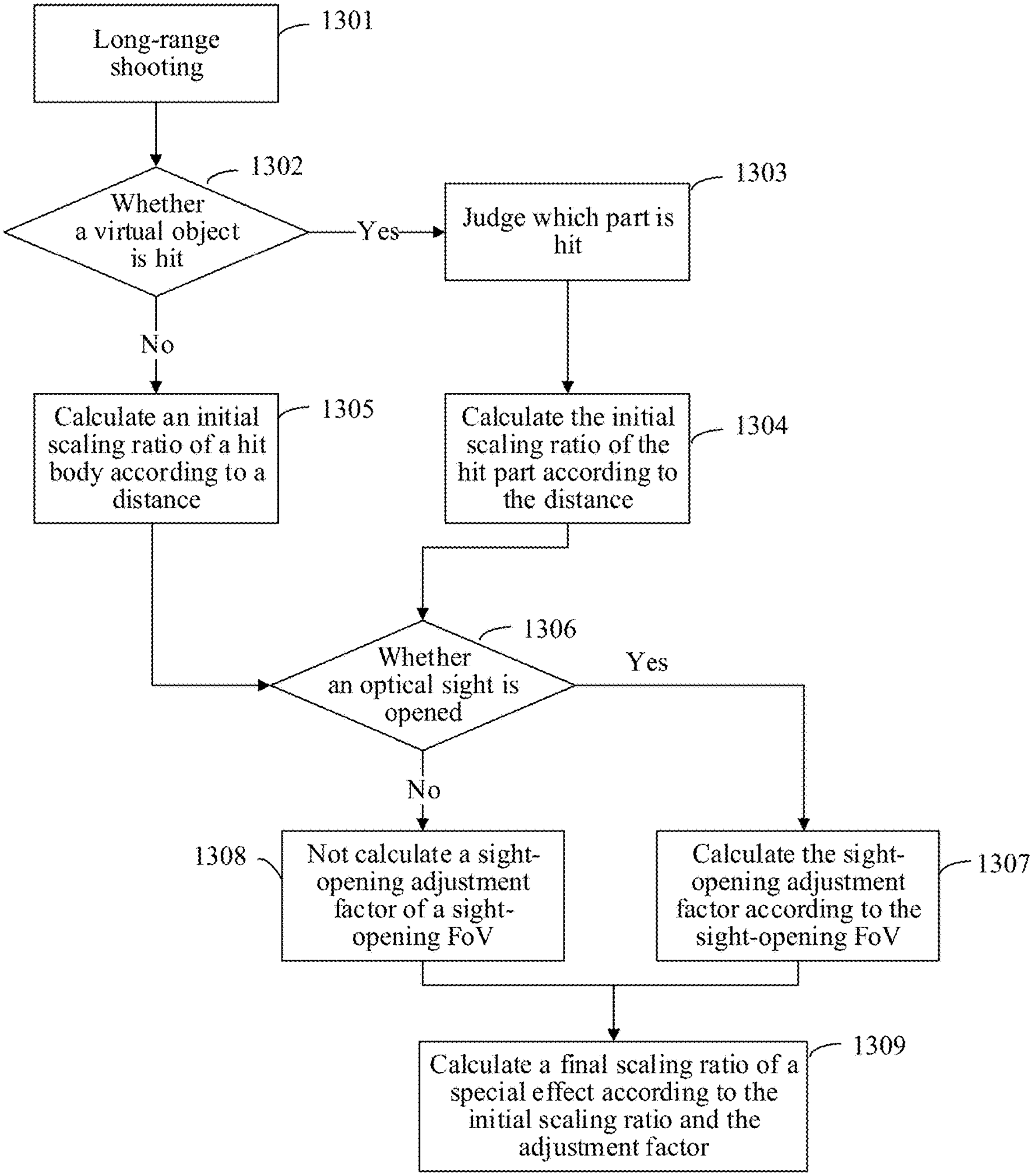
FIG. 13 is a principal flowchart of a prop special effect display method according to an embodiment of this disclosure.

FIG. 13 is a principal flowchart of a prop special effect display method according to an embodiment of this disclosure. As shown in FIG. 13, a display process of the prop special effect in the shooting game of the large-range scene or the open world is shown as follows;

Step 1301: A user controls a first virtual object to launch a launcher of the virtual prop from a long distance by using the virtual prop, and hit a target object.

Step 1302: A terminal judges whether the target object hit this time is a second virtual object controlled by another user; if so, steps 1303-1304 are performed; and if not, step 1305 is performed.

Step 1303: The second virtual object is hit, and the terminal judges which body part is hit.

Step 1304: The terminal calculates an initial scaling ratio in a case that the corresponding body part of the second virtual object is hit according to a distance between the first virtual object and the second virtual object.

Step 1305: A target body is hit this time, and the terminal calculates the initial scaling ratio in a case that the target body is hit according to the distance between the first virtual object and the target body.

Step 1306: The terminal judges whether an optical sight is opened, the opening referring to opening an optical sight; if so, step 1307 is performed; and if not, step 1308 is performed.

Step 1307: The terminal calculates an adjustment factor for the initial scaling ratio according to FoV after the optical sight is opened.

Step 1308: The terminal does not need to calculate the FoV after the optical sight is opened, and does not need to calculate the adjustment factor for the initial scaling ratio.

Step 1309: The terminal adjusts the original initial scaling ratio according to the calculated adjustment factor to obtain the final scaling ratio of the special effect, and in a case that the adjustment factor is not calculated, the initial scaling ratio is directly used as the final scaling ratio of the special effect.

It should be noted that, the above steps of calculating the initial scaling ratio and the sequence of the steps of calculating the adjustment factors may be exchanged, and the performing sequence of the steps is not specifically limited by the embodiments of this disclosure.

In the embodiment of this disclosure, the problem of poor use feeling of the virtual prop in a case of long-range shooting in the shooting game of the large-range scene or the open world is optimized. The prop special effect played in a case that the target object is hit is magnified by detecting the distance between the first virtual object and the target object according to a certain curve rule. Moreover, different prop special effects may be played according to different detected object types of the target object. In this way, the information acquisition efficiency of the user can be improved, and the use feeling of the virtual prop in a case of long-range shooting in the shooting game of the large-range scene or the open world can be optimized.

Further, in some game modes or game types with high operation difficulty, a sight bead that is conventional in the traditional shooting games and the hit text prompting information displayed in the HUD manner may be eliminated. In this way, the prop special effect display method provided in the embodiment of this disclosure can give full hints by using the prop special effect in a case that the first virtual object is controlled by the user to perform the long-range shooting. The hint can prompt the fact that the target object is already hit, which part of the target object is hit, which type of target object is hit, and the like, which can assist the user to quickly determine the hit situation of the launcher this time, and can also assist the user to judge whether an expected shooting target is hit (for example, in a case that the played special effect is not the special effect corresponding to the aimed shooting target, it can be quickly discovered that other shooting target is injured by mistake), and can also quickly confirm a trajectory of the distanced launcher. In addition, in a case that the hit sound effect is also played, the user can also be assisted to confirm whether the target object is hit this time, so that the use feeling of the virtual prop in a case of long-range shooting in the shooting game of the large-range scene or the open world is greatly optimized, and the human-computer interaction efficiency is improved.

Figure 14:
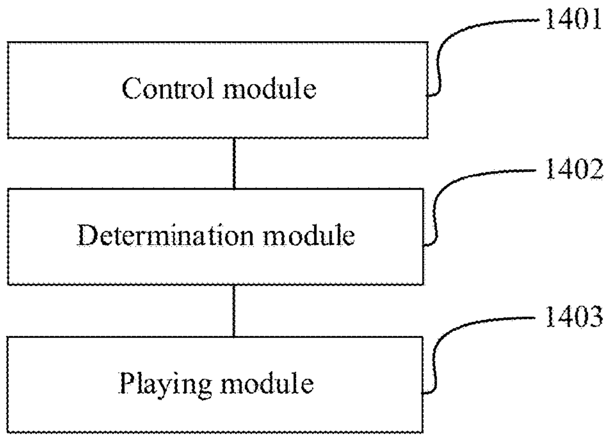
FIG. 14 is a schematic structural diagram of a prop special effect display apparatus according to an embodiment of this disclosure.

FIG. 14 is a schematic structural diagram of a prop special effect display apparatus according to an embodiment of this disclosure. As shown in FIG. 14, the apparatus includes:

a control module 1401, configured to control a first virtual object in a virtual scene to launch a launcher associated with the virtual prop in response to a launching operation for the virtual prop;

a determination module 1402, configured to determine a scaling ratio of a special effect based on a distance between the first virtual object and a target object in a case that the launcher hits the target object, the scaling ratio of the special effect being positively correlated with the distance; and a playing module 1403, configured to play the prop special effect of the virtual prop based on the scaling ratio of the special effect.

According to the apparatus provided in the embodiments of this disclosure, in a case that the launcher of the virtual prop hits the target object, the scaling ratio of the special effect that is positively correlated with the distance is determined based on the distance between the first virtual object and the target object hit this time, and the prop special effect is played in the determined scaling ratio of the special effect, so that even in a case of long-range shooting, the prop special effect that is originally reduced under the near-big and far-small vision principle is magnified by increasing the scaling ratio of the special effect, and the prop special effect played in the virtual scene is more prominent, thereby increasing the amount of information carried in the virtual scene, and improving the information acquisition efficiency. Since the phenomenon that the prop special effect is easy to ignore in a case of long-range shooting is improved, the use feeling of the virtual prop is also optimized, thereby improving the human-computer interaction efficiency.

In a possible implementation, the target object is a second virtual object, and based on the apparatus composition of FIG. 14, the determination module 1402 includes:

a first determination unit, configured to determine the scaling ratio of the special effect based on a body part of the second virtual object hit by the launcher and the distance.

In a possible implementation, the first determination unit is configured to:

determine a distance scaling curve associated with the body part, the distance scaling curve representing a relationship between the scaling ratio of the special effect and the distance between the first virtual object and the second virtual object in a case that the body part is hit; and determine the scaling ratio of the special effect matched with the distance based on the distance scaling curve.

In a possible implementation, the first determination unit is further configured to:

determine an expansion coefficient for the scaling ratio of the special effect based on a size of an obstacle in a case that there is the obstacle between the first virtual object and the second virtual object; and determine the scaling ratio of the special effect based on the expansion coefficient, the body part, and the distance.

In a possible implementation, based on the apparatus composition of FIG. 14, the apparatus further includes:

an adjustment module, configured to adjust a display position of the prop special effect based on a position of the obstacle in a case that there is the obstacle between the first virtual object and the second virtual object.

In a possible implementation, the target object is a target body, and the determination module 1402 is configured to:

determine the scaling ratio of the special effect matched with the distance based on the target scaling curve, the target scaling curve representing a relationship between the scaling ratio of the special effect and the distance between the first virtual object and the virtual body.

In a possible implementation, based on the apparatus composition of FIG. 14, the determination module 1402 includes:

a second determination unit, configured to determine the scaling ratio of the special effect based on a field of view of an optical sight and the distance in a case that the optical sight is opened by the first virtual object.

In a possible implementation, based on the apparatus composition of FIG. 14, the second determination unit includes:

a first determination subunit, configured to determine an initial scaling ratio based on the distance, the initial scaling ratio being positively correlated with the distance;

a second determination subunit, configured to determine an adjustment factor based on the field of view, the adjustment factor being positively correlated with the field of view; and a third determination subunit, configured to determine the scaling ratio of the special effect based on the initial scaling ratio and the adjustment factor.

In a possible implementation, the second determination subunit is configured to:

determine the adjustment factor matched with the field of view based on a view scaling curve, the view scaling curve representing a relationship between the scaling ratio of the special effect and the field of view of the optical sight.

In a possible implementation, the field of view of the optical sight is determined based on a magnification ratio of the optical sight.

In a possible implementation, the playing module 1403 is configured to:

determine the prop special effect associated with an object type based on the object type of the target object; and play the prop special effect in the scaling ratio of the special effect based on the target object.

In a possible implementation, the determination module 1402 is further configured to: determine a volume adjustment coefficient based on the distance between the first virtual object and the target object in a case that the prop special effect includes a hit sound effect; and the playing module 1403 is further configured to: adjust a playing volume of the hit sound effect based on the volume adjustment coefficient.

Any combination of the foregoing technical solutions may be used to obtain an embodiment of this disclosure. Details are not described herein.

It is to be noted that, the above functional modules are only described for exemplary purposes in a case that the prop special effect display apparatus provided by the foregoing embodiments displays the prop special effect. In actual applications, the functions may be allocated to different functional modules according to specific needs, which means that the internal structure of the electronic device is divided to different functional modules to complete all or some of the above described functions. In addition, the prop special effect display apparatus provided in the foregoing embodiments is based on the same concept as the prop special effect display method embodiments. For the specific implementation process, refer to the prop special effect display method embodiments, and the details are not described herein again.

Figure 15:
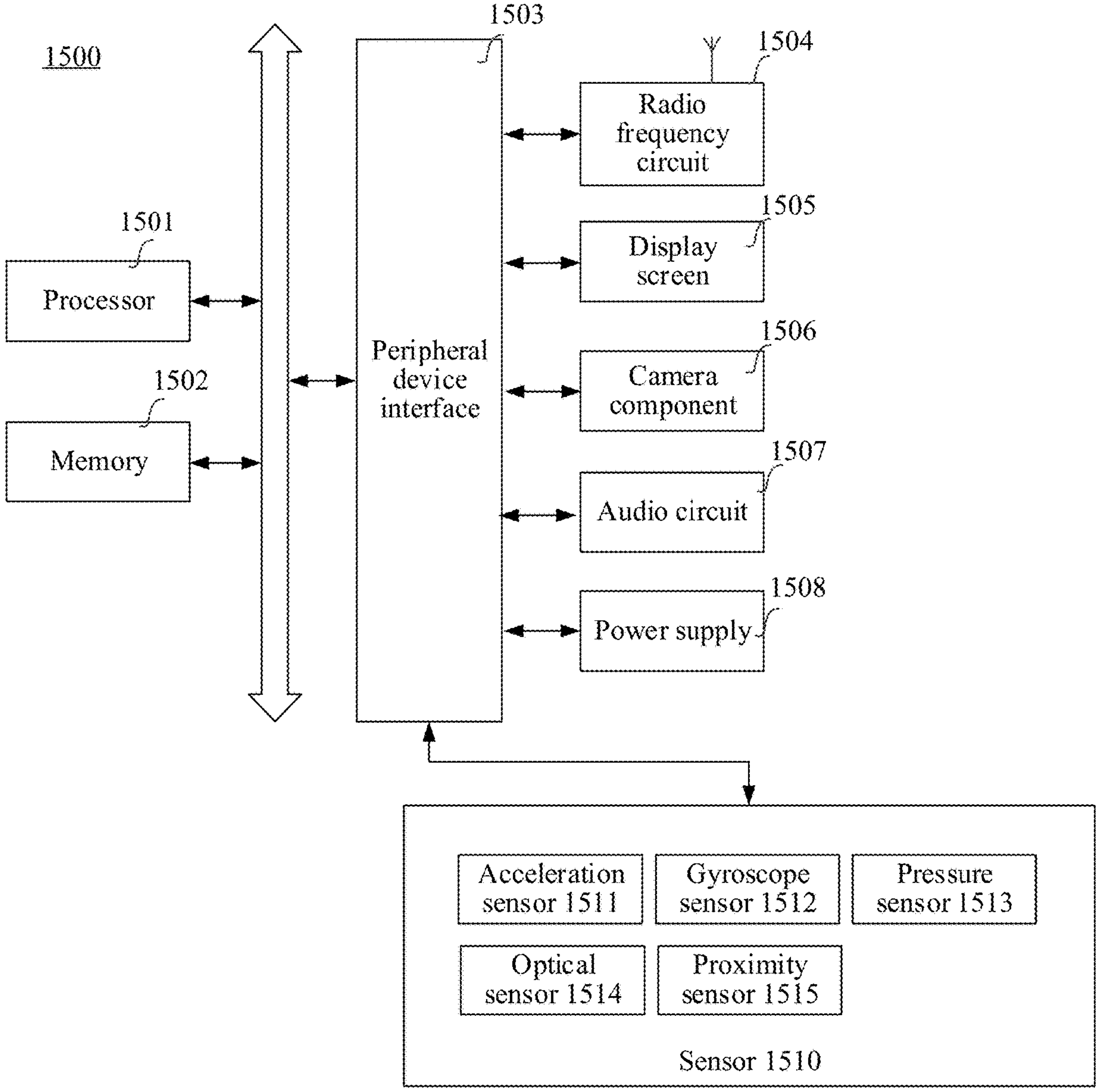
FIG. 15 is a schematic structural diagram of a terminal according to an embodiment of this disclosure.

FIG. 15 is a schematic structural diagram of a terminal according to an embodiment of this disclosure. As shown in FIG. 15, the terminal 1500 is an exemplary description of an electronic device. Equipment types of the terminal 1500 include: a smart phone, a tablet computer, a Moving Picture Experts Group Audio Layer III (MP3) player, a Moving Picture Experts Group Audio Layer IV (MP4) player, a notebook computer, or a desktop computer. The terminal 1500 may also be referred to as another name such as user equipment, a portable terminal, a laptop terminal, or a desktop terminal.

The terminal 1500 generally includes: a processor 1501 (processing circuitry) and a memory 1502 (non-transitory computer-readable storage medium).

The processor 1501 includes one or more processing cores, for example, a 4-core processor or an 8-core processor. The processor 1501 is implemented in at least one hardware form of a digital signal processor (DSP), a field-programmable gate array (FPGA), and a programmable logic array (PLA). In some embodiments, the processor 1501 includes a main processor and a coprocessor. The main processor is a processor configured to process data in an awake state, and is also referred to as a central processing unit (CPU). The co-processor is a low power consumption processor configured to process the data in a standby state. In some embodiments, the processor 1501 is integrated with a graphics processing unit (GPU). The GPU is configured to render and draw content that needs to be displayed on a display screen. In some embodiments, the processor 1501 further includes an artificial intelligence (AI) processor. The AI processor is configured to process computing operations related to machine learning.

In some embodiments, the memory 1502 includes one or more computer-readable storage media, the computer-readable storage medium is non-transitory. The memory 1502 further includes a high-speed random access memory and a nonvolatile memory, such as one or more disk storage devices or flash storage devices. In some embodiments, the non-transitory computer-readable storage medium in the memory 1502 is configured to store at least one program code, and the at least one program code is configured to be executed by the processor 1501 to implement the prop special effect display method provided in various embodiments of this disclosure.

In some embodiments, the terminal 1500 further includes: a peripheral device interface 1503 and at least one peripheral device. The processor 1501, the memory 1502, and the peripheral device interface 1503 can be connected through a bus or a signal cable. Each peripheral device may be connected to the peripheral device interface 1503 through a bus, a signal cable, or a circuit board. Specifically, the peripheral device includes: at least one of a radio frequency (RF) circuit 1504, a display screen 1505, a camera component 1506, an audio circuit 1507, and a power supply 1508.

The peripheral device interface 1503 may be configured to connect the at least one peripheral device related to input/output (I/O) to the processor 1501 and the memory 1502. In some embodiments, the processor 1501, the memory 1502, and the peripheral device interface 1503 are integrated on a same chip or circuit board. In some other embodiments, any one or two of the processor 1501, the memory 1502, and the peripheral device interface 1503 are implemented on a single chip or circuit board. This is not limited in this embodiment.

The RF circuit 1504 is configured to receive and transmit an RF signal, also referred to as an electromagnetic signal. The RF circuit 1504 communicates with a communication network and other communication devices through the electromagnetic signal. The RF circuit 1504 converts an electric signal into an electromagnetic signal for transmission, or converts a received electromagnetic signal into an electric signal. The RF circuit 1504 includes: an antenna system, an RF transceiver, one or more amplifiers, a tuner, an oscillator, a digital signal processor, a codec chip set, a subscriber identity module card, and the like. The RF circuit 1504 may communicate with another terminal by using at least one wireless communications protocol. The wireless communication protocol includes, but is not limited to: a metropolitan area network, generations of mobile communication networks (2G, 3G, 4G, and 5G), a wireless local area network, and/or a wireless fidelity (Wi-Fi) network. In some embodiments, the RF circuit 1504 further includes a circuit related to near field communication (NFC), which is not limited in this disclosure.

The display screen 1505 is configured to display a user interface (UI). The UI includes a graph, text, an icon, a video, and any combination thereof. In a case that the display screen 1505 is a touch display screen, the display screen 1505 further has a capability of acquiring a touch signal on or above a surface of the display screen 1505. The touch signal can be inputted to the processor 1501 as a control signal for processing. The display screen 1505 may be further configured to provide a virtual button and/or a virtual keyboard that are/is also referred to as a soft button and/or a soft keyboard. In some embodiments, one display screen 1505 is arranged at a front panel of the terminal 1500; in some other embodiments, two display screens 1505 are respectively arranged on different surfaces of the terminal 1500 or are in a folding design; and in some other embodiments, the display screen 1505 is a flexible display screen, and is arranged on a curved surface or a folded surface of the terminal 1500. In an embodiment, the display screen 1505 is set in a non-rectangular irregular pattern, namely, a special-shaped screen. The display screen 1505 may be prepared by using materials such as a liquid crystal display (LCD), an organic light-emitting diode (OLED), or the like.

The camera component 1506 is configured to acquire images or videos. The camera component 1506 includes a front-facing camera and a rear-facing camera. Generally, the front-facing camera is disposed on the front panel of the terminal, and the rear-facing camera is disposed on a back surface of the terminal. In some embodiments, there are at least two rear-facing cameras, which are respectively any one of a main camera, a depth-of-field camera, a wide-angle camera, and a telephoto camera, to achieve background blur through fusion of the main camera and the depth-of-field camera, panoramic photographing and virtual reality (VR) photographing through fusion of the main camera and the wide-angle camera, or other fusion photographing functions. In some embodiments, the camera component 1506 further includes a flash. The flash may be a monochrome temperature flash, or may be a double color temperature flash. The double color temperature flash refers to a combination of a warm light flash and a cold light flash, and is used for light compensation under different color temperatures.

In some embodiments, the audio circuit 1507 includes a microphone and a speaker. The microphone is configured to acquire sound waves of a user and an environment, and convert the sound waves into an electric signal to input to the processor 1501 for processing, or input to the radio frequency circuit 1504 for implementing voice communication. For the purpose of stereo acquisition or noise reduction, there may be a plurality of microphones, respectively disposed at different portions of the terminal 1500. The microphone is an array microphone or an omni-directional acquisition type microphone. The speaker is configured to convert electric signals from the processor 1501 or the RF circuit 1504 into sound waves. The speaker is a conventional film speaker, or a piezoelectric ceramic speaker. In a case that the speaker is the piezoelectric ceramic speaker, the speaker not only can convert an electric signal into acoustic waves audible to a human being, but also can convert an electric signal into acoustic waves inaudible to a human being, for ranging and other purposes. In some embodiments, the audio circuit 1507 further includes an earphone jack.

The power supply 1508 is configured to supply power to components in the terminal 1500. The power supply 1508 is an alternating current, a direct current, a primary battery, or a rechargeable battery. In a case that the power supply 1508 includes the rechargeable battery, the rechargeable battery supports wired charging or wireless charging. The rechargeable battery is further configured to support a fast charging technology.

In some embodiments, the terminal 1500 further includes one or more sensors 1510. The one or more sensors 1510 include, but are not limited to: an acceleration sensor 1511, a gyroscope sensor 1512, a pressure sensor 1513, an optical sensor 1514, and a proximity sensor 1515.

In some embodiments, the acceleration sensor 1511 detects a magnitude of acceleration on three coordinate axes of a coordinate system established with the terminal 1500. For example, the acceleration sensor 1511 is configured to detect components of gravity acceleration on the three coordinate axes. The processor 1501 controls the display screen 1505 to display the UI in a landscape view or a portrait view according to a gravity acceleration signal acquired by the acceleration sensor 1511. The acceleration sensor 1511 is further configured to acquire motion data of a game or a user.

In some embodiments, the gyroscope sensor 1512 detects a body direction and a rotation angle of the terminal 1500. The gyroscope sensor 1512 cooperates with the acceleration sensor 1511 to acquire a 3D action of the user on the terminal 1500. The processor 1501 implements the following functions according to the data acquired by the gyroscope sensor 1512: motion sensing (such as changing the UI according to a tilt operation of the user), image stabilization at shooting, game control, and inertial navigation.

The pressure sensor 1513 is disposed at a side frame of the terminal 1500 and/or a lower layer of the display screen 1505. In a case that the pressure sensor 1513 is disposed at the side frame of the terminal 1500, a holding signal of the user on the terminal 1500 can be detected. The processor 1501 performs left and right hand recognition or a quick operation according to the holding signal acquired by the pressure sensor 1513. In a case that the pressure sensor 1513 is disposed at the low layer of the display screen 1505, the processor 1501 controls an operable control on the UI according to a pressure operation of the user on the display screen 1505. The operable control includes at least one of a button control, a scroll-bar control, an icon control, and a menu control.

The optical sensor 1514 is configured to acquire ambient light intensity. In an embodiment, the processor 1501 controls the display brightness of the display screen 1505 according to the ambient light intensity acquired by the optical sensor 1514. Specifically, in a case that the ambient light intensity is relatively high, the display brightness of the display screen 1505 is increased; and in a case that the ambient light intensity is relatively low, the display brightness of the display screen 1505 is decreased. In another embodiment, the processor 1501 also dynamically adjusts a camera parameter of the camera component 1506 according to the ambient light intensity acquired by the optical sensor 1514.

The proximity sensor 1515, also referred to as a distance sensor, is generally disposed on the front panel of the terminal 1500. The proximity sensor 1515 is configured to acquire a distance between the user and the front surface of the terminal 1500. In an embodiment, in a case that the proximity sensor 1515 detects that the distance between the user and the front surface of the terminal 1500 gradually decreases, the display screen 1505 is controlled by the processor 1501 to switch from a screen-on state to a screen-off state. In a case that the proximity sensor 1515 detects that the distance between the user and the front surface of the terminal 1500 gradually increases, the display screen 1505 is controlled by the processor 1501 to switch from the screen-off state to the screen-on state.

A person skilled in the art can understand that the structure shown in FIG. 15 constitutes no limitation on the terminal 1500, and the terminal may include more or fewer components than those shown in the figure, or some components may be combined, or a different component deployment may be used.

Figure 16:
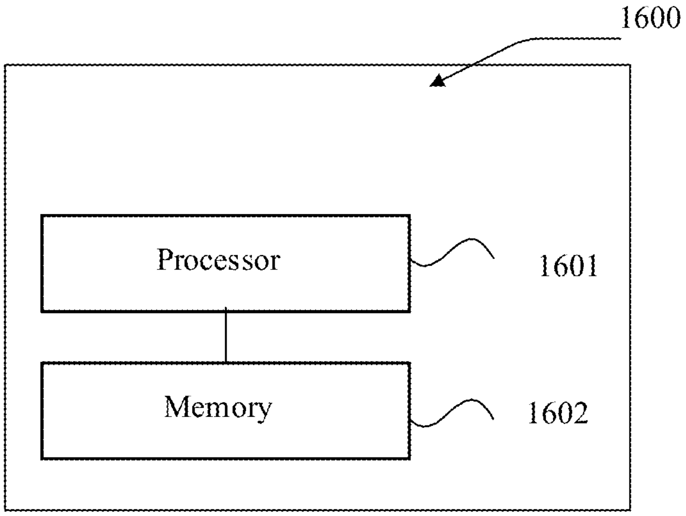
FIG. 16 is a schematic structural diagram of an electronic device according to an embodiment of this disclosure.

FIG. 16 is a schematic structural diagram of an electronic device according to an embodiment of this disclosure. The electronic device 1600 may vary a lot due to different configurations or performance, and the electronic device 1600 includes one or more central processing units (CPUs) 1601 and one or more memories 1602. The memory 1602 stores at least one computer program, and the at least one computer program is loaded and executed by the one or more CPUs 1601 to implement the prop special effect display method provided in the foregoing embodiments. The electronic device 1600 further includes components such as a wired or wireless network interface, a keyboard, and an input/output (I/O) interface, to facilitate input and output. The electronic device 1600 further includes another component configured to implement a function of a device. Details are not further described herein.

In an exemplary embodiment, a computer-readable storage medium, such as a memory including at least one computer program, is further provided, and the at least one computer program may be executed by a processor in a terminal to complete the prop special effect display method in the foregoing embodiments. For example, the computer-readable storage medium includes a read-only memory (ROM), a random access memory (RAM), a compact disc read-only memory (CD-ROM), a magnetic tape, a floppy disk, an optical data storage device, and the like.

In an exemplary embodiment, a computer program product or a computer program is further provided, which includes one or more computer codes, the one or more computer codes being stored in a computer-readable storage medium. One or more processors of an electronic device can read the one or more program codes from the computer-readable storage medium, and the one or more processors execute the one or more program codes, so that the electronic device can execute the prop special effect display method in the foregoing embodiments.

A person of ordinary skill in the art can understand that all or some of the steps of the foregoing embodiments can be implemented by hardware, or by program instructing relevant hardware. The program is stored in a computer-readable storage medium, in an embodiment the above-mentioned storage medium is a read-only memory, a magnetic disk, an optical disk, or the like.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The use of "at least one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof.

The foregoing disclosure includes some exemplary embodiments of this disclosure which are not intended to limit the scope of this disclosure. Other embodiments shall also fall within the scope of this disclosure.

What is claimed is:

1. A prop special effect display method, comprising:

controlling a first virtual object in a virtual scene to launch a projectile associated with a virtual prop in response to receiving a launching operation for the virtual prop;

in response to the projectile hitting a target object in the virtual scene, determining a scaling ratio of a special effect of the virtual prop based on a distance between the first virtual object and the target object, the scaling ratio of the special effect being positively correlated with the distance, the special effect comprises at least one of a video or audio output and the scaling ratio comprises a display size or a volume; and playing the special effect of the virtual prop based on the scaling ratio of the special effect.

2. The method according to claim 1, wherein the target object is a second virtual object, and the determining the scaling ratio comprises:

determining the scaling ratio of the special effect based on a body part of the second virtual object hit by the projectile and based on the distance.

3. The method according to claim 2, wherein the determining the scaling ratio of the special effect based on the body part of the second virtual object hit by the projectile and based on the distance comprises:

determining a distance scaling curve associated with the body part, the distance scaling curve representing a relationship between the scaling ratio of the special effect and a distance between the first virtual object and the second virtual object when the body part is hit; and determining the scaling ratio of the special effect corresponding to the distance between the first virtual object and the second virtual object based on the distance scaling curve.

4. The method according to claim 2, wherein the determining the scaling ratio of the special effect based on the body part of the second virtual object hit by the projectile and based on the distance comprises:

determining an expansion coefficient for the scaling ratio of the special effect based on a size of an obstacle when there the obstacle is located between the first virtual object and the second virtual object; and determining the scaling ratio of the special effect based on the expansion coefficient, the body part, and the distance.

5. The method according to claim 2, the method further comprising:

when an obstacle is located between the first virtual object and the second virtual object, adjusting a display position of the special effect based on a position of the obstacle.

6. The method according to claim 1, wherein the target object is a target structure, and the determining the scaling ratio comprises:

determining the scaling ratio of the special effect corresponding to the distance based on a target scaling curve, the target scaling curve representing a relationship between the scaling ratio of the special effect and a distance between the first virtual object and the target structure.

7. The method according to claim 1, wherein the determining the scaling ratio comprises:

determining the scaling ratio of the special effect based on a field of view of an optical sight and the distance when the first virtual object has opened the optical sight.

8. The method according to claim 7, wherein the determining the scaling ratio of the special effect based on the field of view of the optical sight and the distance comprises:

determining an initial scaling ratio based on the distance, the initial scaling ratio being positively correlated with the distance;

determining an adjustment factor based on the field of view, the adjustment factor being positively correlated with a range of the field of view; and determining the scaling ratio of the special effect based on the initial scaling ratio and the adjustment factor.

9. The method according to claim 8, wherein the determining the adjustment factor based on the field of view comprises:

determining the adjustment factor corresponding to the range of the field of view based on a view scaling curve, the view scaling curve representing a relationship between the adjustment factor of the scaling ratio of the special effect and the range of the field of view of the optical sight.

10. The method according to claim 7, wherein a range of the field of view of the optical sight is determined based on a magnification ratio of the optical sight.

11. The method according to claim 1, wherein the playing the special effect of the virtual prop comprises:

determining the special effect based on an object type of the target object; and playing the special effect using the scaling ratio of the special effect.

12. The method according to claim 1, the method further comprising:

when the special effect comprises the audio output, determining a volume adjustment coefficient based on the distance between the first virtual object and the target object; and adjusting a playing volume of the audio output based on the volume adjustment coefficient.

13. A prop special effect display apparatus, comprising:

processing circuitry configured to control a first virtual object in a virtual scene to launch a projectile associated with a virtual prop in response to receiving a launching operation for the virtual prop;

in response to the projectile hitting a target object in the virtual scene, determine a scaling ratio of a special effect of the virtual prop based on a distance between the first virtual object and the target object, the scaling ratio of the special effect being positively correlated with the distance, the special effect comprises at least one of a video or audio output and the scaling ratio comprises a display size or a volume; and play the special effect of the virtual prop based on the scaling ratio of the special effect.

14. The apparatus according to claim 13, wherein the target object is a second virtual object, and the processing circuitry is further configured to:

determine the scaling ratio of the special effect based on a body part of the second virtual object hit by the projectile and based on the distance.

15. The apparatus according to claim 14, wherein the processing circuitry is further configured to:

determine a distance scaling curve associated with the body part, the distance scaling curve representing a relationship between the scaling ratio of the special effect and a distance between the first virtual object and the second virtual object when the body part is hit; and determine the scaling ratio of the special effect corresponding to the distance between the first virtual object and the second virtual object based on the distance scaling curve.

16. The apparatus according to claim 14, wherein the processing circuitry is further configured to:

determine an expansion coefficient for the scaling ratio of the special effect based on a size of an obstacle when there the obstacle is located between the first virtual object and the second virtual object; and determine the scaling ratio of the special effect based on the expansion coefficient, the body part, and the distance.

17. The apparatus according to claim 14, the processing circuitry is further configured to:

when an obstacle is located between the first virtual object and the second virtual object, adjust a display position of the special effect based on a position of the obstacle.

18. The apparatus according to claim 13, wherein the target object is a target structure, and the processing circuitry is further configured to:

determine the scaling ratio of the special effect corresponding to the distance based on a target scaling curve, the target scaling curve representing a relationship between the scaling ratio of the special effect and a distance between the first virtual object and the target structure.

19. The apparatus according to claim 13, wherein the processing circuitry is further configured to:

determine the scaling ratio of the special effect based on a field of view of an optical sight and the distance when the first virtual object has opened the optical sight.

20. A non-transitory computer-readable storage medium storing computer-readable instructions thereon, which, when executed by processing circuitry, cause the processing circuitry to perform a prop special effect display method, comprising:

controlling a first virtual object in a virtual scene to launch a projectile associated with a virtual prop in response to receiving a launching operation for the virtual prop;

in response to the projectile hitting a target object in the virtual scene, determining a scaling ratio of a special effect of the virtual prop based on a distance between the first virtual object and the target object, the scaling ratio of the special effect being positively correlated with the distance, the special effect comprises at least one of a video or audio output and the scaling ratio comprises a display size or a volume; and playing the special effect of the virtual prop based on the scaling ratio of the special effect.

* * * * *